United States Patent
Hadwen

(10) Patent No.: US 9,458,543 B2
(45) Date of Patent: Oct. 4, 2016

(54) ACTIVE MATRIX ELECTROWETTING-ON-DIELECTRIC DEVICE

(71) Applicant: SHARP KABUSHIKI KAISHA, Abeno-ku, Osaka-shi (JP)

(72) Inventor: Benjamin James Hadwen, Oxford (GB)

(73) Assignee: Sharp Kabushiki Kaisha, Osaka (JP)

(*) Notice: Subject to any disclaimer, the term of this patent is extended or adjusted under 35 U.S.C. 154(b) by 974 days.

(21) Appl. No.: 13/693,250

(22) Filed: Dec. 4, 2012

(65) Prior Publication Data

US 2014/0151232 A1    Jun. 5, 2014

(51) Int. Cl.
| | |
|---|---|
| G01R 27/28 | (2006.01) |
| B01D 59/46 | (2006.01) |
| G06F 3/038 | (2013.01) |
| C25B 9/04 | (2006.01) |
| B01L 3/00 | (2006.01) |
| G02B 26/00 | (2006.01) |

(52) U.S. Cl.
CPC .............. *C25B 9/04* (2013.01); *B01L 3/502792* (2013.01); *G02B 26/005* (2013.01); *B01L 2300/0816* (2013.01); *B01L 2300/0887* (2013.01); *B01L 2400/0427* (2013.01)

(58) Field of Classification Search
CPC ................... B01L 3/502707; B01L 3/502792; B01L 3/50273; B01L 2200/143; B01L 2200/148; B01L 2300/0819; B01L 2400/0427; B01L 2300/0816; G01N 27/44791; G01N 27/4163
USPC ......... 324/551, 649, 691; 204/600, 663, 450
See application file for complete search history.

(56) References Cited

U.S. PATENT DOCUMENTS

| | | |
|---|---|---|
| 6,565,727 B1 | 5/2003 | Shenderov |
| 6,911,132 B2 | 6/2005 | Pamula et al. |
| 7,163,612 B2 | 1/2007 | Sterling et al. |

(Continued)

FOREIGN PATENT DOCUMENTS

| | | |
|---|---|---|
| EP | 2404675 | 1/2012 |
| EP | 2484449 A1 | 8/2012 |

(Continued)

OTHER PUBLICATIONS

R.B. Fair; "Digital microfluidics: is a true lab-on-a-chip possible?"; Microfluid Nanofluid; 2007.

*Primary Examiner* — Melissa Koval
*Assistant Examiner* — Courtney McDonnough
(74) *Attorney, Agent, or Firm* — Renner, Otto, Boisselle & Sklar, LLP

(57) ABSTRACT

An active matrix electrowetting on dielectric (AM-EWOD) device includes a plurality of array elements configured to manipulate one or more droplets of fluid on an array, each of the array elements including a corresponding array element circuit. Each array element circuit includes write circuitry configured to write data to the corresponding array element for controlling the manipulation of the droplets of fluid, and sensor circuitry configured to sense an impedance present at the corresponding array element. The sensor circuitry is configured to operate in one of a normal mode of sensitivity for detection of a droplet, or a high mode of sensitivity to detect an electric property of an array element hydrophobic surface. The sensor circuitry includes an active element, such as an active capacitor or active transistor, and a capacitance across the active element is different in the normal sensitivity mode as compared to the high sensitivity mode.

18 Claims, 23 Drawing Sheets

(56) References Cited

U.S. PATENT DOCUMENTS

| 8,173,000 | B1 | 5/2012 | Hadwen et al. |
| 2009/0280251 | A1 | 11/2009 | DeGuzman et al. |
| 2012/0006684 | A1* | 1/2012 | Hadwen .................. G09G 3/00 204/600 |
| 2012/0007608 | A1 | 1/2012 | Hadwen et al. |
| 2012/0106238 | A1 | 5/2012 | John et al. |
| 2012/0194492 | A1 | 8/2012 | Hadwen et al. |

FOREIGN PATENT DOCUMENTS

| JP | 2012-018400 | 1/2012 | |
| JP | 2012-163956 | 8/2012 | |
| NL | WO 2011145929 A1 * | 11/2011 | ........... G01N 1/4022 |

* cited by examiner

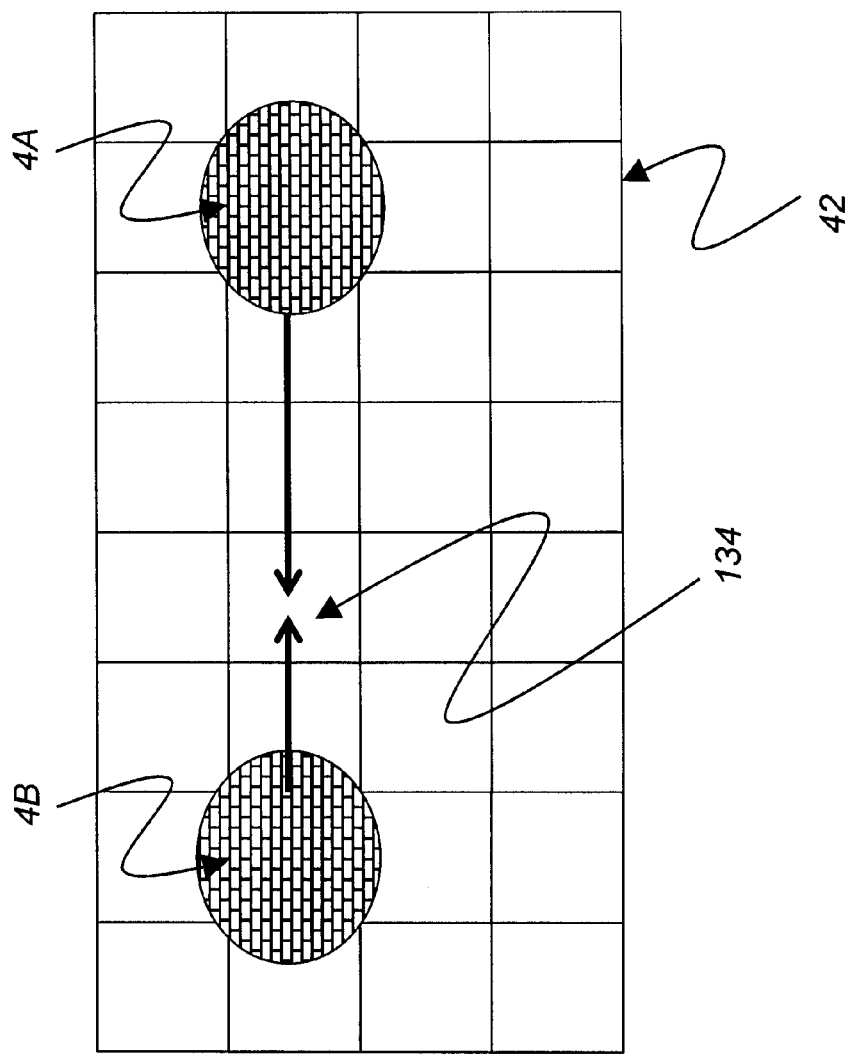

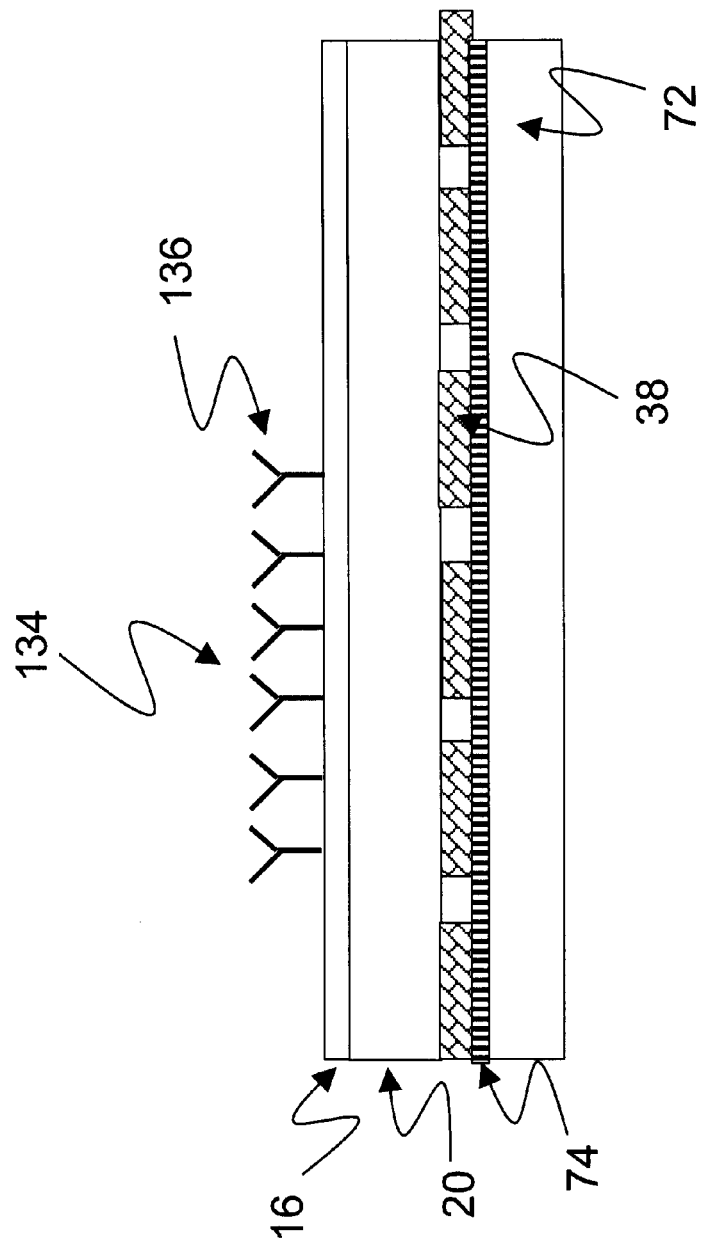

ACTIVE MATRIX ELECTROWETTING-ON-DIELECTRIC DEVICE

TECHNICAL FIELD

The present invention relates to active matrix arrays and elements thereof. In a particular aspect, the present invention relates to digital microfluidics, and more specifically to Active Matrix Electrowetting-On-Dielectric (AM-EWOD) devices. Electrowetting-On-Dielectric (EWOD) is a known technique for manipulating droplets of fluid on an array. Active Matrix EWOD (AM-EWOD) refers to implementation of EWOD in an active matrix array, for example by using thin film transistors (TFTs). The invention further relates to methods of driving such a device.

BACKGROUND ART

Electrowetting-on-dielectric (EWOD) is a well known technique for manipulating droplets of fluid by application of an electric field. EWOD is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 72, the uppermost layer of which is formed from a conductive material which is patterned so that a plurality of electrodes 38 (e.g., 38A and 38B in FIG. 1) are realized. These may be termed the electrowetting (EW) drive elements. A droplet 4, consisting of a polar material, is constrained in a plane between the lower substrate 72 and a top substrate 36. A suitable gap between the two substrates may be realized by means of a spacer 32, and a non-polar fluid 34 (e.g. oil) may be used to occupy the volume not occupied by the polar liquid droplet 4. An insulator layer 20, which is frequently, but not necessarily comprised of a dielectric material, is disposed upon the lower substrate 72 separates the conductive electrodes 38A, 38B from a hydrophobic surface 16 upon which the liquid droplet 4 sits with a contact angle 6 represented by angle θ. On the top substrate 36 is another hydrophobic layer 26 with which the liquid droplet 4 may come into contact. Interposed between the top substrate 36 and the hydrophobic layer 26 is a top substrate electrode 28. In operation, voltages, termed the electrowetting (EW) drive voltages, (e.g. $V_T$, $V_0$ and $V_{00}$) may be externally applied to the different electrodes (e.g. drive element electrodes 28, 38A and 38B, respectively). The hydrophobicity of the hydrophobic surface 16 can be thus be controlled, thus facilitating droplet movement in the lateral plane between the two substrates 72 and 36.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 6,565,727 above further discloses methods for other droplet operations, including the splitting and merging of droplets and the mixing together of droplets of different materials.

U.S. Pat. No. 7,163,612 (J. Sterling et al., issued Jan. 16, 2007) describes how TFT based electronics may be used to control the addressing of voltage pulses to an EWOD array by using circuit arrangements very similar to those employed in AM display technologies.

The approach of U.S. Pat. No. 7,163,612 may be termed "Active Matrix Electrowetting on Dielectric" (AM-EWOD). There are several advantages in using TFT based electronics to control an EWOD array, namely:

Driver circuits can be integrated onto the AM-EWOD array substrate.

TFT-based electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes.

This is significant since many EWOD technologies require EWOD actuation voltages in excess of 20V to be applied.

U.S. Pat. No. 7,163,612 above does not disclose any circuit embodiments for realizing the TFT backplane of the AM-EWOD.

EP2404675 (Hadwen et al., published Jan. 11, 2012) describes array element circuits for an AM-EWOD device. Various methods are known for programming and applying an EWOD actuation voltage to the EWOD drive electrode. The voltage write function described includes a memory element of standard means, for example based on Dynamic RAM (DRAM) or Static RAM (SRAM) and input lines for programming the array element.

US application 2012/0007608 (Hadwen et al., published Jan. 12, 2012) describes how an impedance (capacitance) sensing function can be incorporated into the array element. The impedance sensor may be used for determining the presence and size of liquid droplets present at each electrode in the array.

U.S. Pat. No. 8,173,000 (Hadwen et al; issued May 8, 2012) describes an AM-EWOD device with array element circuit and method for writing an AC actuation voltage to the electrode. This patent further describes methods of driving the device sometimes in an AC and sometimes in a DC mode, so as to be compatible with the operation of integrated sensor functions.

US application 2009/0280251 (DeGuzman et al., published Nov. 12, 2009) describes means for mitigating adsorption of bio-molecules to hydrophobic surfaces in a microfluidic device.

SUMMARY OF INVENTION

An aspect of the invention is an AM-EWOD device with an integrated impedance (capacitance) sensing function incorporated into the array element, in which the sensor is capable of operating in multiple distinct sensitivity ranges.

According to a basic aspect there may be at least two sensitivity ranges including:

a normal or low sensitivity mode, which may be used for detecting the presence/absence of a liquid droplet or detecting the size of a droplet, and a high sensitivity mode, which may be used for detecting small capacitances or small changes in capacitance at the hydrophobic surface, usually to be used in the case where the droplet is absent.

An advantage of the invention is that the additional high sensitivity mode of operation facilitates the detection of small capacitances/capacitance changes at the hydrophobic surface. These may, for example, result from the adsorption of biomoelecules (e.g. protein, DNA) onto the surface. The invention may thus provide a means for detecting surface binding. Alternatively, the invention may also provide a means for detecting surface contamination (biofouling).

A further advantage of the invention is that the additional high sensitivity mode of the sensor has been implemented without any additional circuit components or complexity in the array element circuit.

According to a further aspect there may be further additional sensitivity ranges provided.

Accordingly, an aspect of the invention is an active matrix electrowetting on dielectric (AM-EWOD) device. The AM-EWOD device includes a plurality of array elements configured to manipulate one or more droplets of fluid on an array, each of the array elements including a corresponding array element circuit. Each array element circuit includes write circuitry configured to write data to the corresponding array element for controlling the manipulation of the one or more droplets of fluid, and sensor circuitry configured to sense an impedance present at the corresponding array element. The sensor circuitry is configured to operate in one of at least a first mode or a second mode, the different modes each having different sensitivity ranges.

Another aspect of the invention is a method of operating an active matrix electrowetting on dielectric (AM-EWOD) device, wherein the AM-EWOD device includes a plurality of array elements configured to manipulate one or more droplets of fluid on an array. The method includes the steps of applying a first voltage to a row select line of an array element, setting sensor circuitry of the array element to operate in a first mode of sensitivity based on the first voltage; applying a second voltage to the row select line, and setting the sensor circuitry of the array element to operate in a second mode of sensitivity based on the second voltage, wherein the first and second modes of sensitivity have differing sensitivity ranges.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 21 shows the operation of the exemplary AM-EWOD device in a example associated with detecting chemical or biochemical reactions, and FIG. 22 shows a part of the exemplary AM-EWOD device in cross section in accordance with another exemplary embodiment of the invention.

Figure 1:
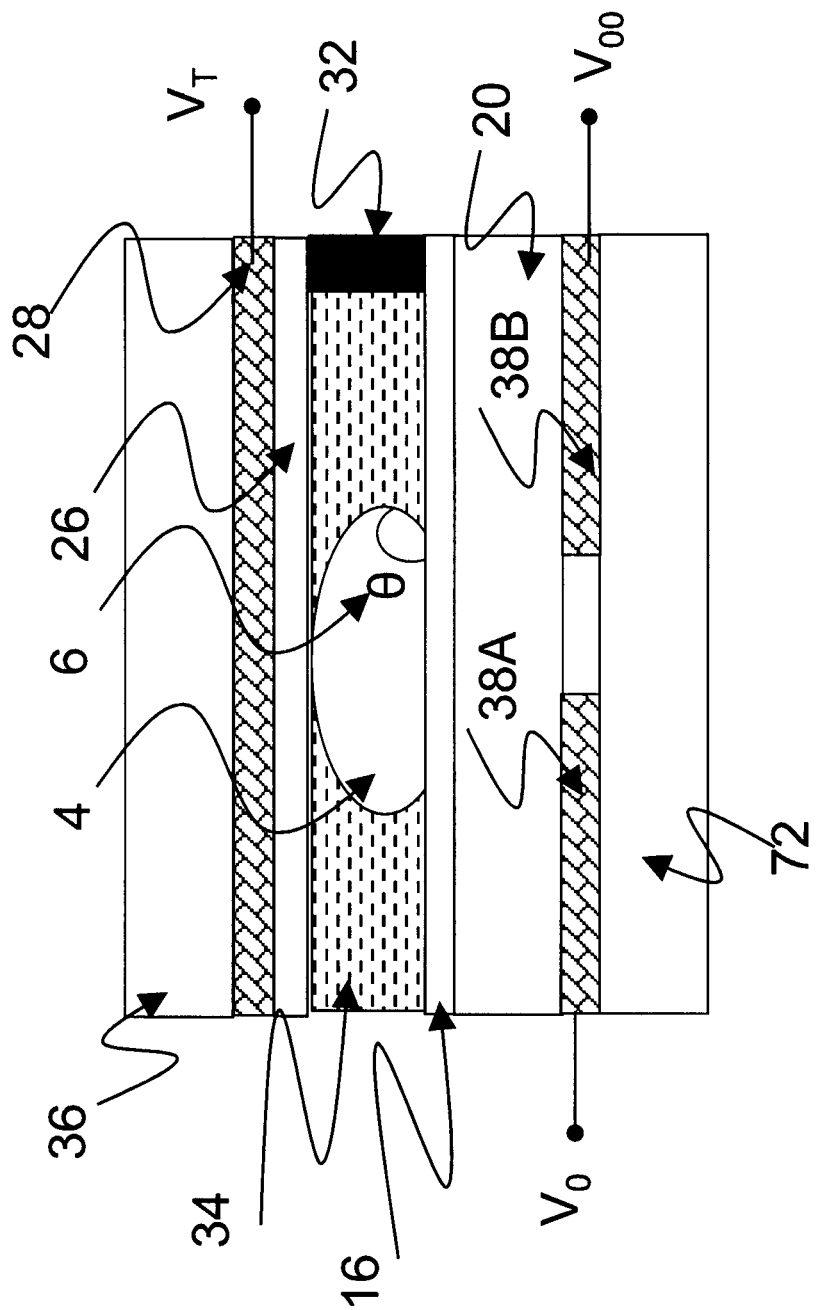
FIG. 1 shows a conventional EWOD device in cross-section.

DESCRIPTION OF REFERENCE NUMERALS 4 liquid droplet
6 contact angle $\theta$
16 Hydrophobic surface
20 Insulator layer
26 Hydrophobic layer
28 Top Electrode
32 Spacer
34 Non-ionic fluid
36 Top substrate
38 Array Element Electrode
42 Electrode array
44 Second Transistor
46 Insulator capacitance
48 Liquid drop capacitance
50 Liquid drop resistance
54 Oil gap capacitance
56 Electrical model of load at electrode
56A Electrical model of load at electrode—droplet present
56B Electrical model of load at electrode—droplet absent 58 Active capacitor
59 Second active capacitor
60 Negative terminal
61 Conductive layer
62 Heavily doped semiconductor material
64 Ohmic contact
66 Lightly doped semiconductor material
67 Dielectric insulator layer
68 Switch Transistor
69 Conductive layer
70 Positive terminal
71 Capacitance-Voltage Characteristic
72 Lower Substrate
74 Thin film electronics
76 Row driver circuit
78 Column driver circuit
80 Serial interface
82 Connecting wires
84 Array element circuit
86 Column detection circuit
88 SRAM element
94 Second Transistor
96 Capacitance voltage characteristic of a first capacitor
98 Capacitance voltage characteristic of a second capacitor
100 Total capacitance voltage characteristic
120 Voltage write circuitry
122 First Analogue switch
124 Second Analogue switch
130 N-type Transistor
132 Contaminated hydrophobic surface
134 Reaction site
136 Surface functionalisation

DESCRIPTION OF EMBODIMENTS

Figure 2:
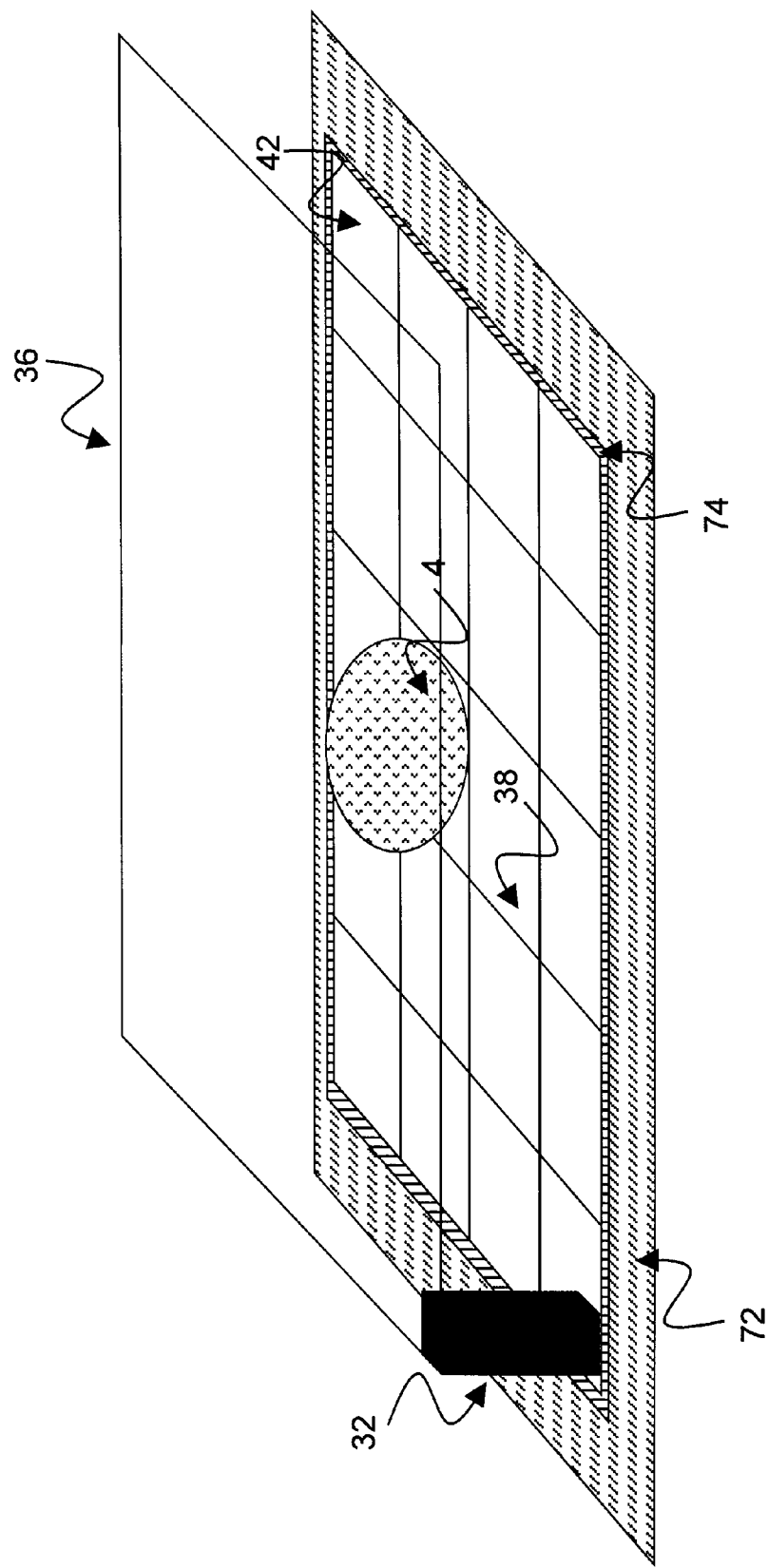
FIG. 2 shows an AM-EWOD device in schematic perspective in accordance with an exemplary embodiment of the invention.

Referring to FIG. 2, shown is an AM-EWOD device in accordance with an exemplary embodiment of the present invention. The AM-EWOD device has a lower substrate 72 with thin film electronics 74 disposed upon the substrate 72. The thin film electronics 74 are arranged to drive array element electrodes 38. A plurality of array element electrodes 38 are arranged in an electrode array 42, having M×N elements where M and N may be any number. An ionic liquid droplet 4 is enclosed between the substrate 72 and a top substrate 36, although it will be appreciated that multiple liquid droplets 4 can be present without departing from the scope of the invention.

Figure 3:
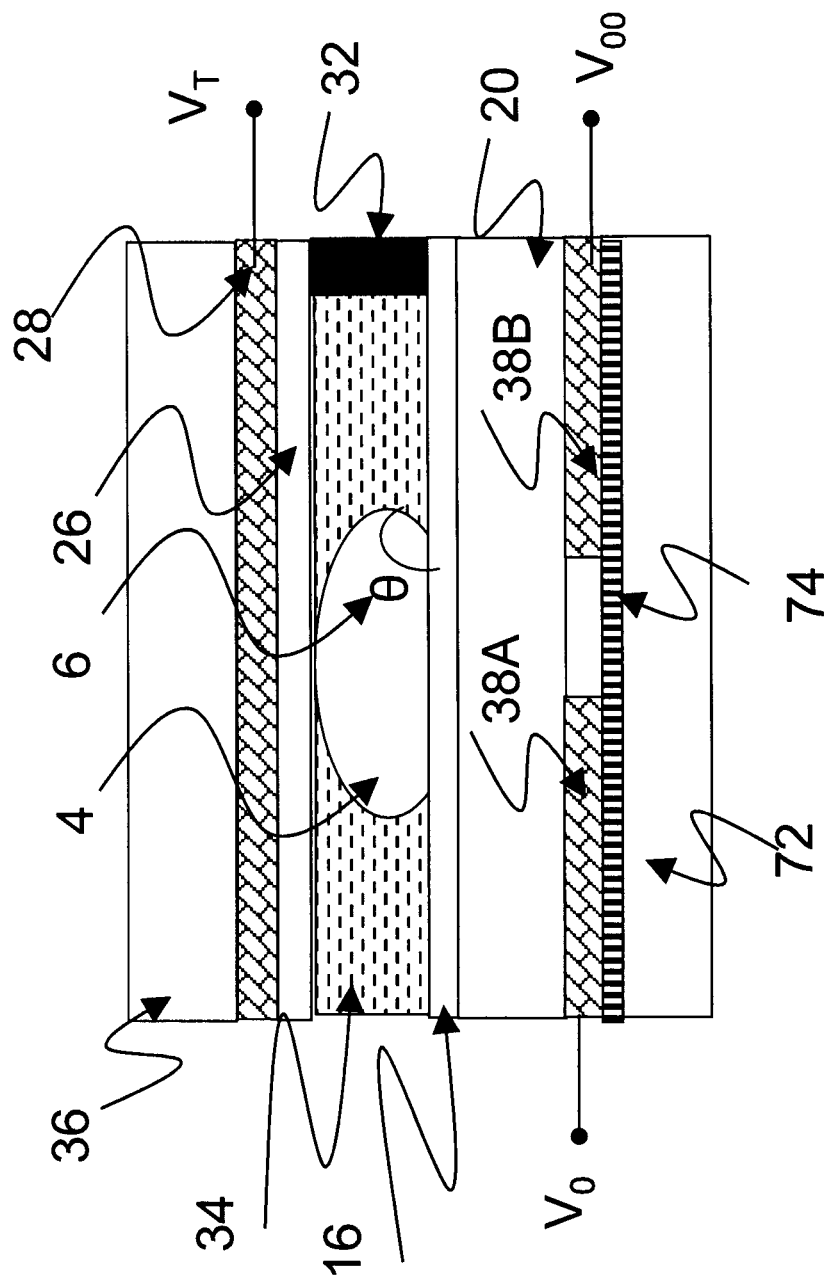
FIG. 3 shows a cross section through some of the array elements of the exemplary AM-EWOD device.

FIG. 3 shows a cross-sectional view of a portion of the AM-EWOD device of FIG. 2 that includes a pair of the array element electrodes 38A and 38B. The lower substrate 72 has the thin-film electronics 74 disposed thereon, which is in contrast to the conventional configuration depicted in FIG. 1. The uppermost layer of the lower substrate 72 (which may be considered a part of the thin film electronics layer 74) is patterned so that a plurality of electrodes 38 (e.g., 38A and 38B in FIG. 3) are realized. These electrode elements are referred to also as electrowetting (EW) drive elements. The term EW drive element may be considered as referring to both to the electrode 38 associated with a particular array element (e.g., the specific elements 38A and 38B), and also to the node of an electrical circuit directly connected to this electrode 38.

Figure 4:
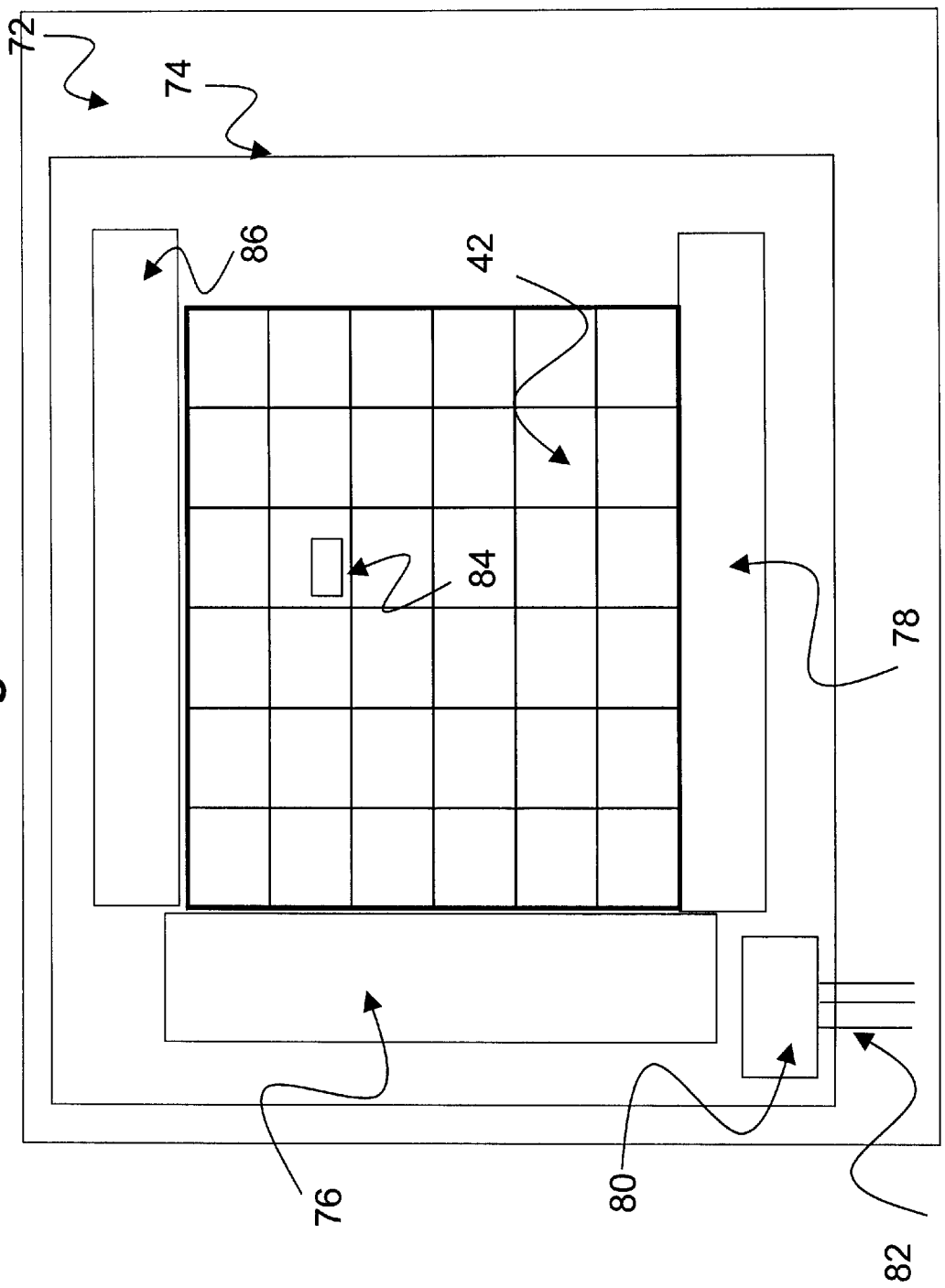
FIG. 4 shows an exemplary arrangement of thin film electronics in the exemplary AM-EWOD device.

The arrangement of thin film electronics 74 upon the substrate 72 is shown in FIG. 4. Each element of the electrode array 42 contains an array element circuit 84 for controlling the electrode potential of a corresponding electrode array element electrode 38. Integrated row driver 76 and column driver 78 circuits are also implemented in thin film electronics 74 to supply control signals to the array element circuits 84.

A serial interface 80 may also be provided to process a serial input data stream and write the required voltages to the electrode array 42. A voltage supply interface 83 provides the corresponding supply voltages, top substrate drive voltages, and related voltages to the thin film electronics as described herein. The number of connecting wires 82 between the array substrate 72 and external drive electronics, power supplies and other electronic components can be made relatively few, even for large array sizes.

Figure 5:
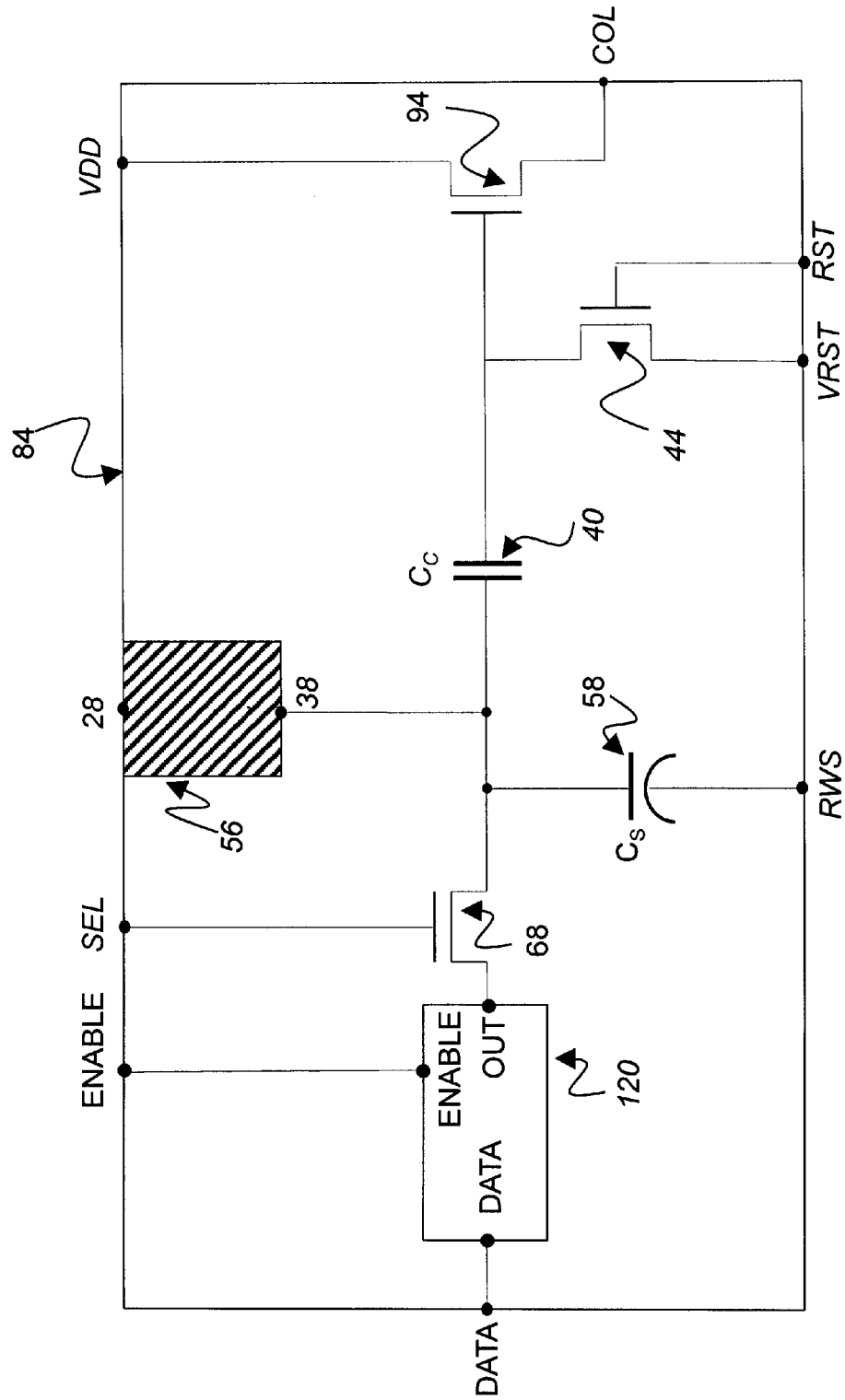
FIG. 5 shows a first embodiment of an exemplary array element circuit of the exemplary AM-EWOD device.

The array element circuit 84 according to a first embodiment of the AM-EWOD is shown in FIG. 5. The remainder of the AM-EWOD device is of the construction previously described with respect to FIGS. 2-4 and includes a top substrate 36 having a top substrate electrode 28.

Each array element circuit 84 contains:
1. Voltage write circuitry 120, for generating an electrowetting control voltage, and
2. Sensor circuitry that includes the following elements:
   A switch transistor 68.
   A capacitor 40.
   A first transistor 94.
   A second transistor 44.
   An active element such as capacitor 58.

The array element circuit 84 is connected as follows.
The input DATA, which may be common to all elements in the same column of the array, is connected to the input DATA of the voltage write circuitry 120. The input ENABLE, which may be common to all elements in the same row of the array, is connected to the input ENABLE of the voltage write circuitry. The output of the voltage write circuitry 120 is connected to the source of the switch transistor 68. The gate of the switch transistor 68 is connected to the select line SEL which may be common to all array elements in the same row of the array. The drain of switch transistor 68 is connected to the electrode 38 and to the positive terminal of the active capacitor 58. The negative terminal of the active capacitor 58 is connected to the row select input RWS which may be common to all elements within the same row of the array. The capacitor 40 is connected between the electrode 38 and the gate of transistor 94. The drain of first transistor 94 is connected to a power supply voltage VDD which may be common to all elements in the array. The source of first transistor 94 is connected to the sensor output COL which may be common to all array elements in the same column of the array. The source of second transistor 44 is connected to the gate of first transistor 94, the gate of second transistor 44 is connected to the reset line RST which may be common to all elements within the same row of the array, and the drain of second transistor 44 is connected to a voltage supply VRST which may be common to all elements within the array.

Figure 6:
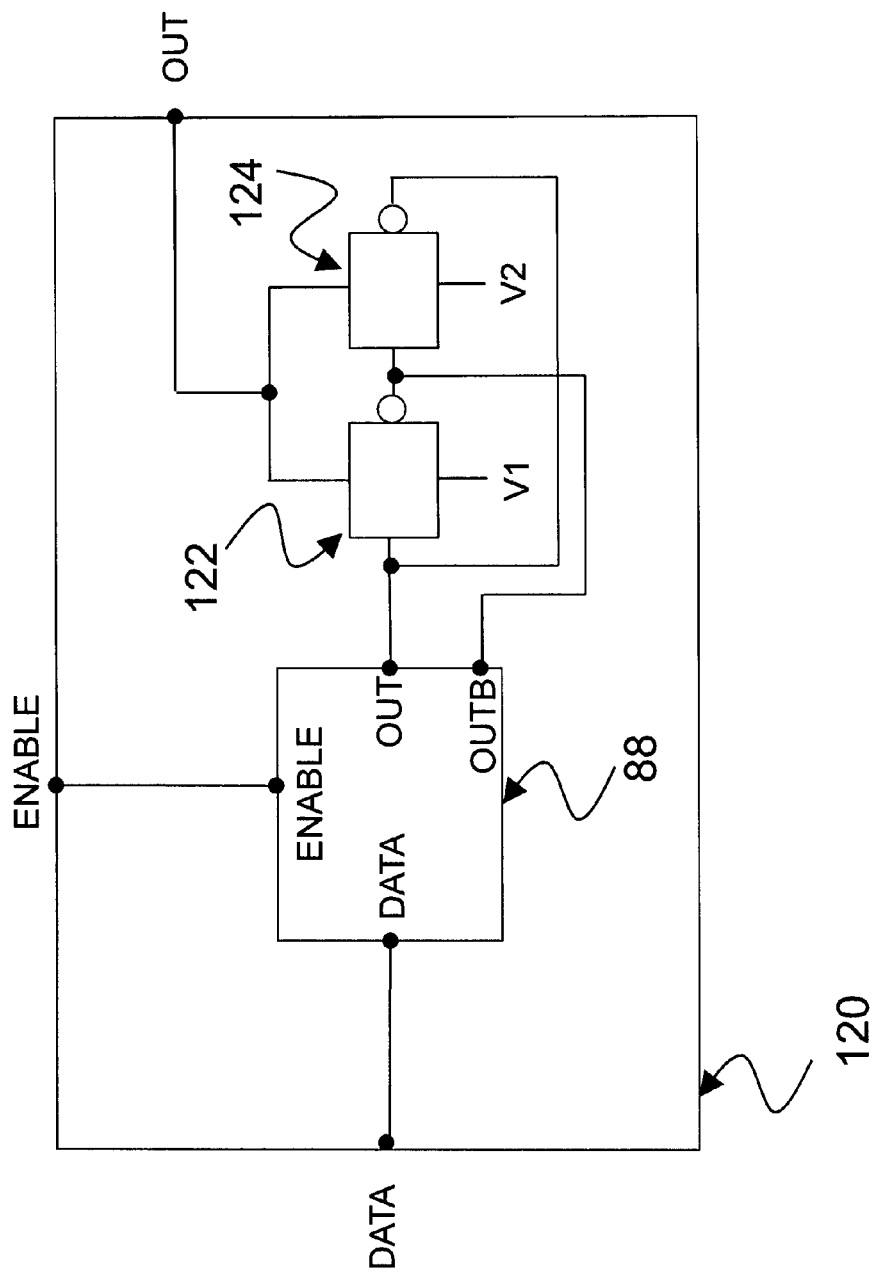
FIG. 6 shows an example design of a voltage generator circuit included in the array element circuit of the first embodiment of the array element circuit of FIG. 5.

In accordance with embodiments of the invention, an active matrix electrowetting on dielectric (AM-EWOD) device includes a plurality of array elements configured to manipulate one or more droplets of fluid on an array, each of the array elements including a corresponding array element circuit. Each array element circuit includes write circuitry 120 configured to write data to the corresponding array element for controlling the manipulation of the one or more droplets of fluid, and sensor circuitry including the transistor and capacitive elements referenced above, including an active element such as active capacitor 58. The sensor circuitry is configured to sense an impedance present at the corresponding array element, and the sensor circuitry is configured to operate in one of at least a first mode of sensitivity or a second mode of sensitivity, wherein the first and second modes of sensitivity have different sensitivity ranges. An example design of the voltage write circuitry 120 is shown in FIG. 6. The voltage write circuitry contains the following components:

1. A first analogue switch 122.
2. A second analogue switch 124.
3. A memory element 88.

The voltage write circuit is 120 connected as follows:

The input DATA is connected to the input DATA of the memory element 88. The input ENABLE is connected to the input ENABLE of the memory element 88. The output OUT of the memory element 88 is connected to the gate of the n-type transistor of first analogue switch 122, and to the gate of the p-type transistor of the second analogue switch 124. The inverted output OUTB of the memory element 88 is connected to the gate of the n-type transistor of second analogue switch 124 and to the gate of the p-type transistor of first analogue switch 122. A supply voltage waveform V1 is connected to the input of first analogue switch 122, and a supply voltage waveform V2 is connected to the input of second analogue switch 124, where both V1 and V2 may be common to all elements within the array. The output of first analogue switch 122 is connected to the output of second analogue switch 124 which is connected to the output OUT of the voltage write circuitry 120.

The memory element 88 may be an electronic circuit of standard means capable of storing a data voltage, for example a Dynamic Random Access Memory (DRAM) cell or a Static Random Access Memory (SRAM) cell as are known in the art.

The operation of the voltage write circuit 120 is described as follows.

Digital data may be written to the memory element 88 by known standard means, the data bit being digital "1" or digital "0", corresponding to high or low voltage levels respectively being programmed to the input line DATA. The data is written to the memory cell when input ENABLE is briefly activated and remains stored in the memory cell, regardless of the voltage level on input DATA until such a time as ENABLE is reactivated. In this way, data may be written to each element in the array in turn. In the case where digital "1" is written to the array element, the output OUT of the memory element 88 is at a high voltage level and output OUTB of the memory element 88 is at a low voltage level. Accordingly, under these circumstances, first analogue switch 122 is turned on, second analogue switch 124 is turned off, and the voltage signal V1 is connected to the output OUT voltage write circuit 120. In the case where digital "0" is written to the array element, the output OUT of the memory element 88 is at low voltage level and output OUTB of the memory element 88 is at high voltage level. Accordingly, first analogue switch 122 is turned off, second analogue switch 124 is turned on, and the voltage signal V2 is connected to the output OUT of voltage write circuit 120. The overall function of the voltage write circuit 120 is therefore to connect either signal V1 or signal V2 to the output OUT voltage write circuit 120 in accordance with the data written and stored in the memory element 88.

In considering the operation of the array element circuit 84 as shown in FIG. 5, account is taken of the electrical load 56 present between the array element electrode 38 and the top substrate electrode 28 of the top substrate 36. This will be described with reference to FIGS. 7 and 8.

Figure 7:
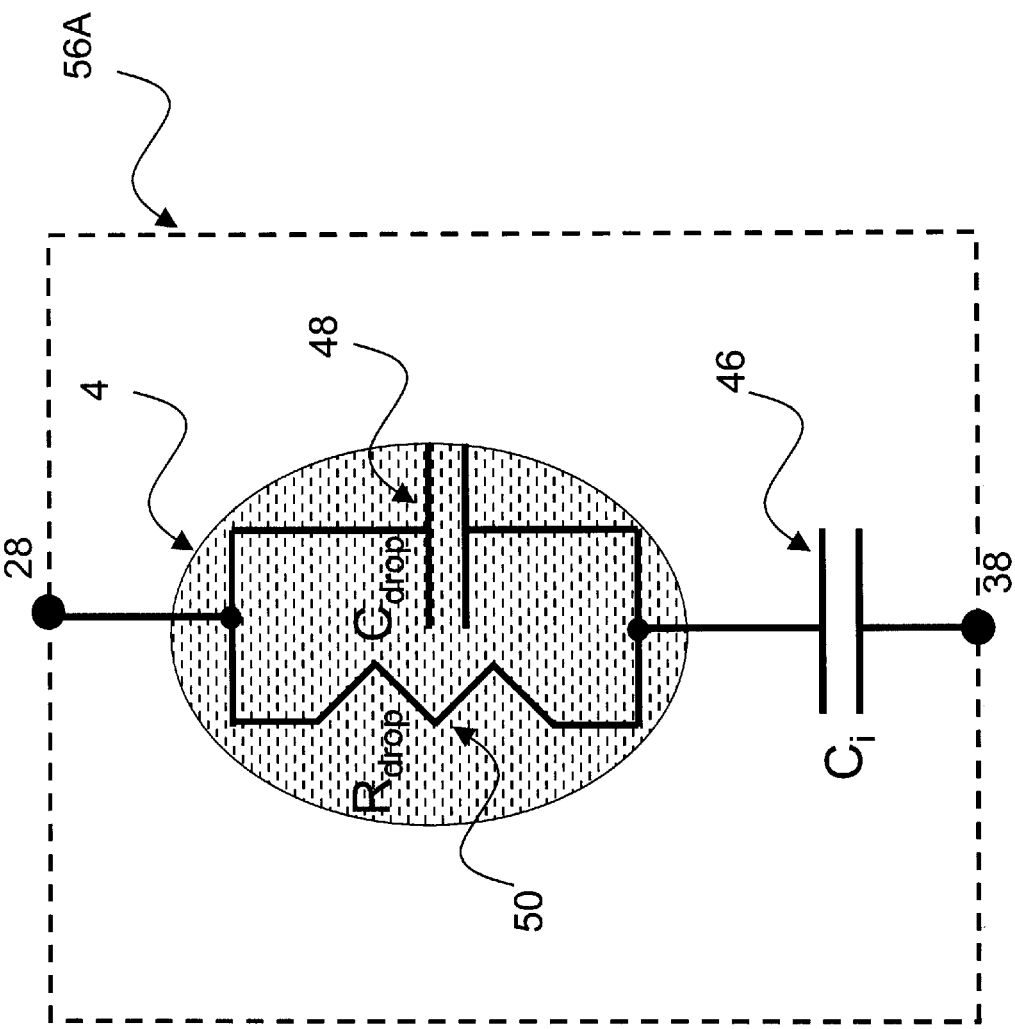
FIG. 7 shows a circuit representation of the load presented at a write electrode of the array element circuit when a liquid droplet is present in a given array element.

When a liquid droplet 4 is present at the location of the array element electrode 38, an electrical representation of the electrical load 56A may be represented as is shown in FIG. 7. The liquid droplet 4 itself may be represented approximately by a resistor 50 of value $R_{DROP}$ in parallel with a capacitor 48 of value $C_{DROP}$. These components are in turn in series with the dielectric insulator 20 and hydrophobic layers 16 and 26 (see, e.g., FIG. 4), which are collectively represented electrically in FIG. 7 by an insulator capacitor of value $C_i$ 46. In many situations, the simplifying assumption can be made that the drop resistance $R_{DROP}$ is relatively small and the total load impedance of the electrical load 56A approximates to that of capacitor $C_i$.

Figure 8:
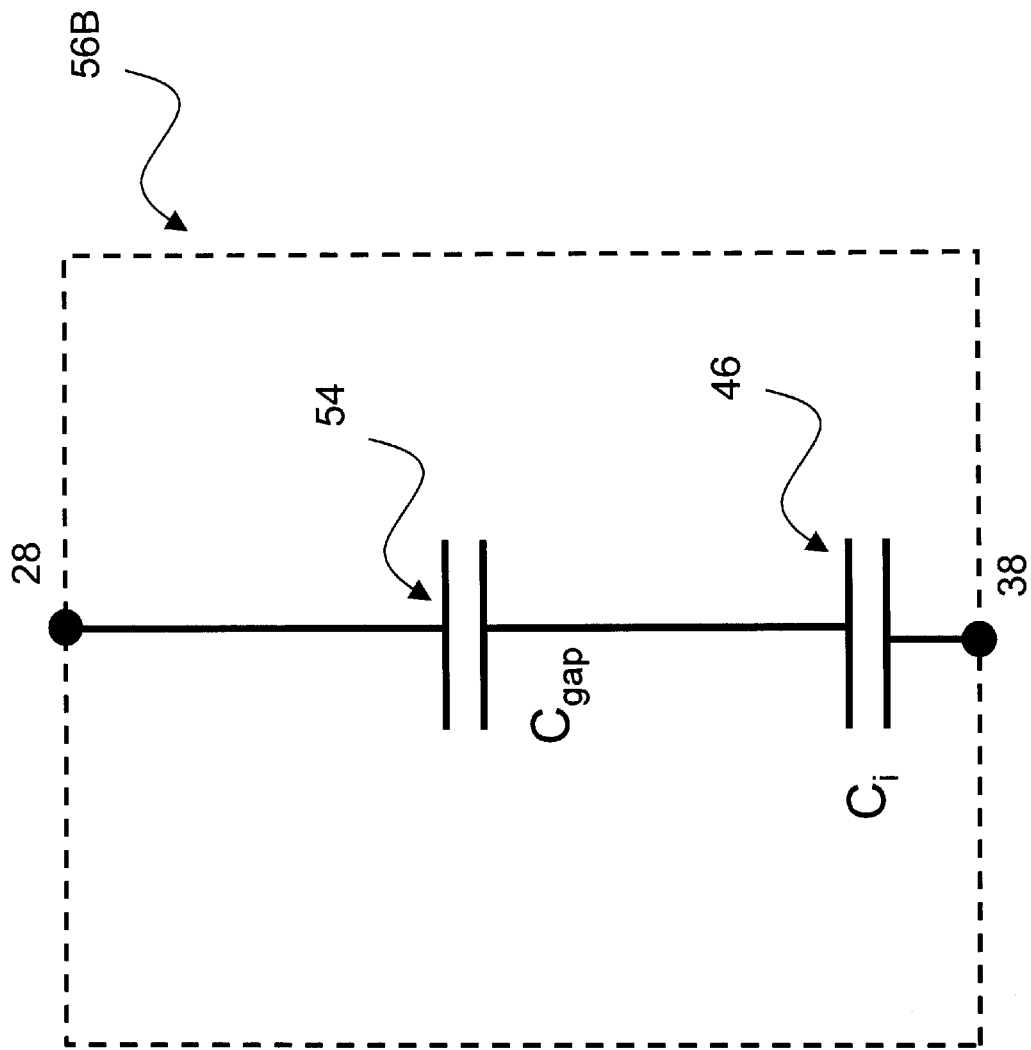
FIG. 8 shows a circuit representation of the load presented at the write electrode of the array element circuit when a liquid droplet is absent from a given array element.

In the alternative scenario where there is no liquid droplet 4 present in the location of the array element, the electrical load 56B may be represented as is shown in FIG. 8. In this situation, the space between the hydrophobic layers 16 and 26 is filled by a non-ionic fluid 34, which may for example be oil, and may be represented electrically by a capacitor 54 of value $C_{gap}$. The total electrical load in this case therefore constitutes capacitor $C_i$ 46 in series with capacitor $C_{gap}$ 54.

Since the dimension of the cell gap will nearly always greatly exceed that of the dielectric insulator, the total capacitance of the electrical load 56B approximates to $C_{gap}$.

Figure 9:
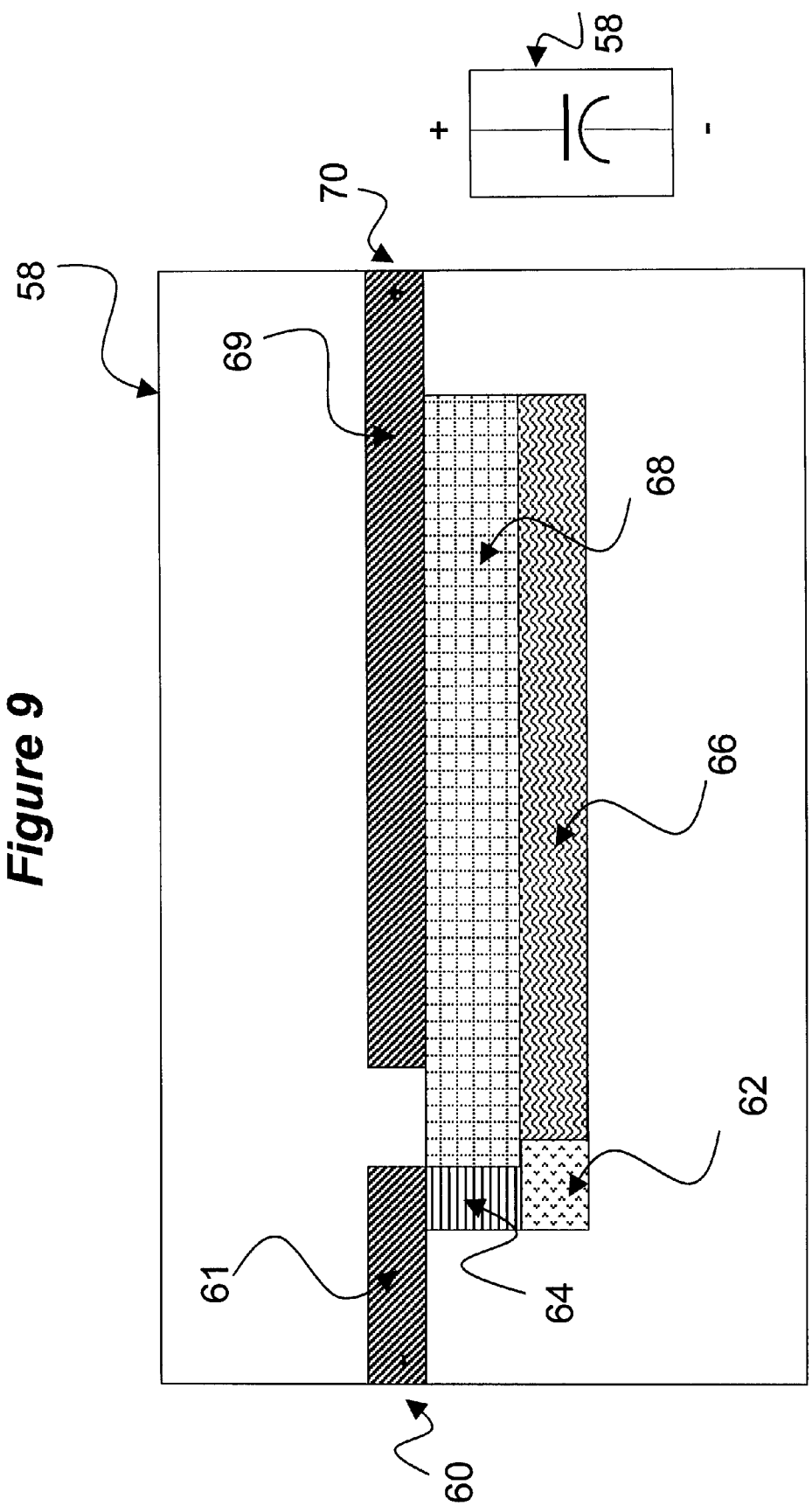
FIG. 9 shows an example implementation in a thin film technology of an active capacitor circuit component of the exemplary array element circuit.

An active element such as the capacitor element 58 is an active (semiconductor) capacitor whose construction and operation will now be described. An example implementation of an active capacitor in a thin film process that may be used for the fabrication of thin film transistors is shown in FIG. 9. A first conductive layer 69, for example a metal, is used to form the positive terminal 70 (+) of the capacitor and the upper plate of the capacitor. A second conductive layer 61 is used to form the negative terminal 60 (−) of the capacitor. Conductive layers 61 and 69 may be formed from the same or from different deposited layers as determined by the exact construction of the device and the details of the fabrication process. The conductive layer 61 is connected via a contact hole 64 to a region of heavily doped semiconductor 62, for example n+ silicon. The heavily doped semiconductor 62 is located spatially in contact with, and thus connected to a lightly doped semiconductor region 66, for example n− silicon, which forms the lower plate of the capacitor.

Figure 10:
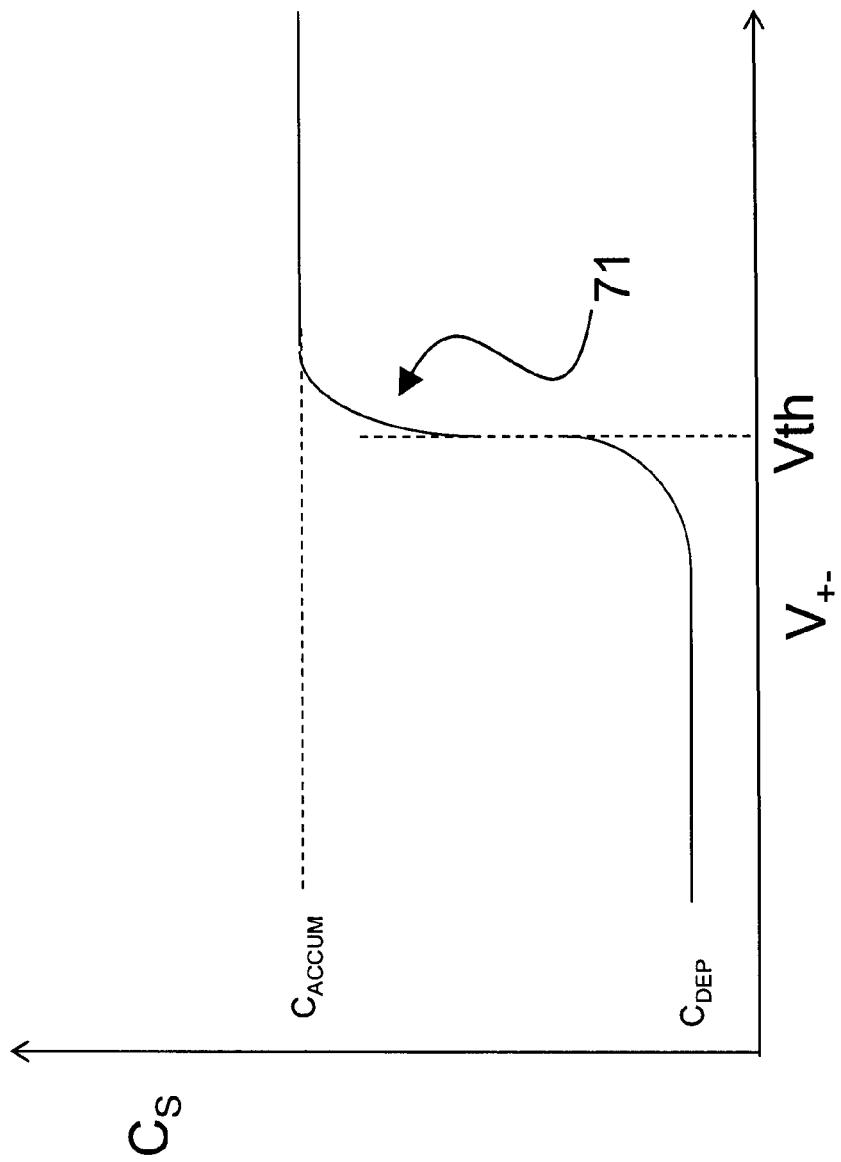
FIG. 10 shows an example capacitance versus voltage characteristic of a thin film active capacitor component such as that of FIG. 9.

The operation of the active capacitor 58 that is formed by this structure is described as follows for the case where the semiconductor regions are formed from n-type material. In the case where the potential difference between the positive and negative terminal of the device, denoted $V_{+-}$, exceeds a certain threshold voltage Vth, (with Vth being a function of the n− dopant concentration in the lightly doped semiconductor region 66), the lightly doped semiconductor region 66 becomes accumulated with electrons and forms a conducting region. As a result the capacitance assumes a large value, $C_{ACCUM}$, dependent principally upon the area of overlap between the capacitor plates and the thickness of the dielectric insulator layer 67 separating the lightly doped semiconductor region 66 from the conductive layer 69. In the case where the potential difference $V_{+-}$ is less than the threshold voltage Vth, the lightly doped semiconductor region 66 becomes depleted of charge carriers. As a result, the capacitance in this case drops to a small value $C_{DEP}$, dependent on parasitic components associated with the construction of the device. The resultant capacitance-voltage characteristic 71 of the device is shown graphically in FIG. 10. With appropriate design, the ratio of $C_{ACCUM}/C_{DEP}$ can be made quite high, typically a factor of 10 or a factor of 100 or more.

It will be appreciated that an active capacitor can also be realized from the structure of FIG. 9 in the case where heavily doped semiconductor region 62 is P+ doped material and lightly doped semiconductor region 66 is P− doped material. The operation of the device is very similar to the operation as described above, except that in the case the lightly doped semiconductor region 66 is accumulated with charge carriers (which are in this case holes) when $V_{+−}$ is less than the threshold voltage Vth, the capacitance assumes a high value $C_{ACCUM}$ for $V_{+−}$<Vth and a low value $C_{DEP}$ for $V_{+−}$>Vth. In this embodiment it has been assumed that the active capacitor 58 is formed from n-type semiconductor material, but it will be readily appreciated that an active capacitor formed from p-type semiconductor material could equally be used when accompanied by a reversal of the terminal connections to the device.

The operation of the array element circuit 84 is now described. The array element circuit essentially performs two functions:
1. Writing an actuation voltage to the array element electrode 38; and
2. Sensing the impedance (capacitance) present at the array element electrode 38

The method for writing an actuating voltage to the electrode 38 is essentially as described in reference U.S. Pat. No. 8,173,000 referred to in the background section. A brief description is given as follows:

As described, above, the write circuitry includes a memory element configured to receive a digital data input corresponding to one of a first voltage or a second voltage. The first voltage may correspond to a low voltage relative to a high voltage being the second voltage. The write circuitry further is configured to output a voltage signal V1 to the array element electrode 38 when the digital data input corresponds to the first voltage and the switch transistor 68 is turned on, and the write circuitry is configured to output a voltage signal V2 to the array element electrode 38 when the digital data input corresponds to the second voltage and the switch transistor 68 is turned on. The voltage signal V2 is also connected to the top electrode 38.

The voltage developed between the array element electrode 38 and the top electrode 28 for the above two cases respectively is therefore given by:
  0, in the case where the first voltage is written to the memory element.
  V1-V2, in the case where the second voltage is written to the memory.

The voltage V1-V2 may be arranged to correspond to the electro-wetting voltage $V_{EW}$ used to actuate any liquid droplet 4 that is present at the location of the array element.

In principle, V1 and V2 could be DC voltage supplies (for example +10V and −10V), but in practice an AC driving method is often to be preferred, in which case V1 and V2 may be square wave waveforms in antiphase with each other.

Figure 6B:
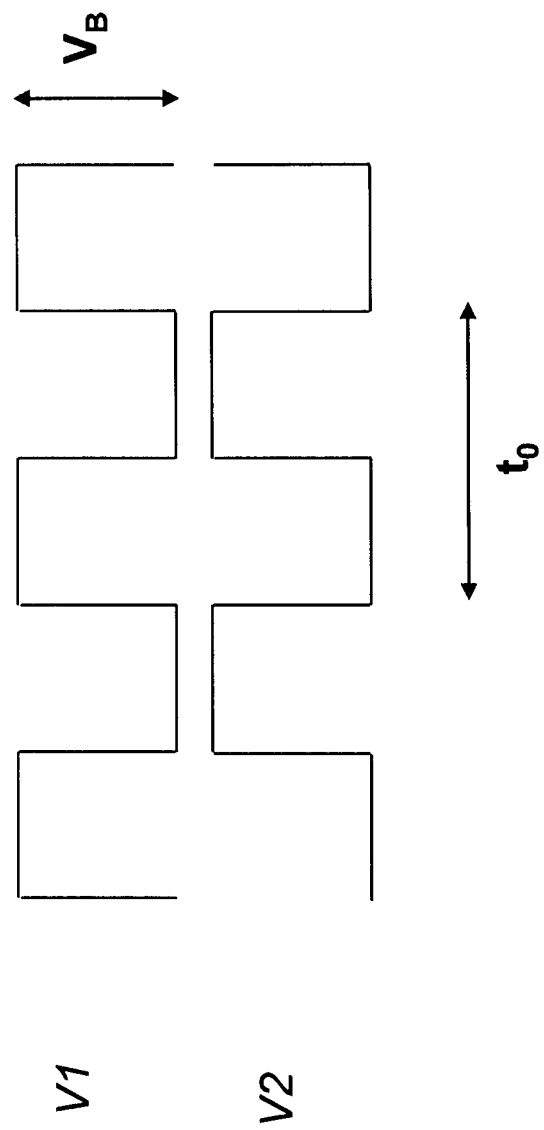
FIG. 6B shows an example timing sequence of the voltage signals V1 and V2.

FIG. 6B shows the time dependence of example voltage signals V1 and V2 as may be employed typically. V1 is a square wave of amplitude $V_B$ and period $t_0$ and $V_2$ is the logical inverse of $V_1$.

Therefore in the case where the first voltage is written to the memory element, the electro-wetting voltage $V_{EW}$ is a square wave of rms amplitude $V_B$. Further description of possible AC waveforms and driving schemes and the advantages thereof are provided in background art reference U.S. Pat. No. 8,173,000.

Therefore, considering the array as whole, by writing appropriate voltage data patterns to the memory element of each element within the array, an arbitrary data pattern may be programmed to the memory elements of each element within the array. As a consequence the same, arbitrary, pattern of voltage waveforms may be applied to the array element electrodes 38 of the elements in the array, i.e., some array elements have voltage signal V1 applied to them, and the other array elements voltage signal V2. Consequently, and in accordance with the written data pattern, some of the array elements are actuated so that the electro-wetting voltage $V_{EW}$ is applied between the array element electrode 38 and top substrate electrode 28, while other array elements are de-actuated and the potential between the array element electrode 38 and top substrate electrode 28 is zero volts.

Therefore, by application of appropriate data patterns, liquid droplets within the array may be manipulated in an arbitrary fashion, for example being made to move between different elements of the array, to be mixed, to merge with other liquid droplets or to split into two or more daughter droplets. Further description of how appropriate data patterns may be used to control the movement of such liquid droplets, and how in doing so liquid droplets may be made to perform chemical reactions or perform chemical or biochemical assays, is given in various background art references including R. B. Fair, Microfluid Nanofluid (2007) 3:245-281), U.S. Pat. No. 6,565,727, U.S. Pat. No. 6,911, 132 and U.S. Pat. No. 6,565,727.

The method for sensing the impedance present at the array element electrode 38 utilizes some of the methods described in reference US application 2012/0007608, also referenced in the background section. The method of sensing impedance of the present invention further describes novel and inventive features that have not been previously described, and in particular the present invention incorporates a method for sensing the impedance in two or more distinct operating ranges, thus realizing a multi range sensor.

Figure 11:
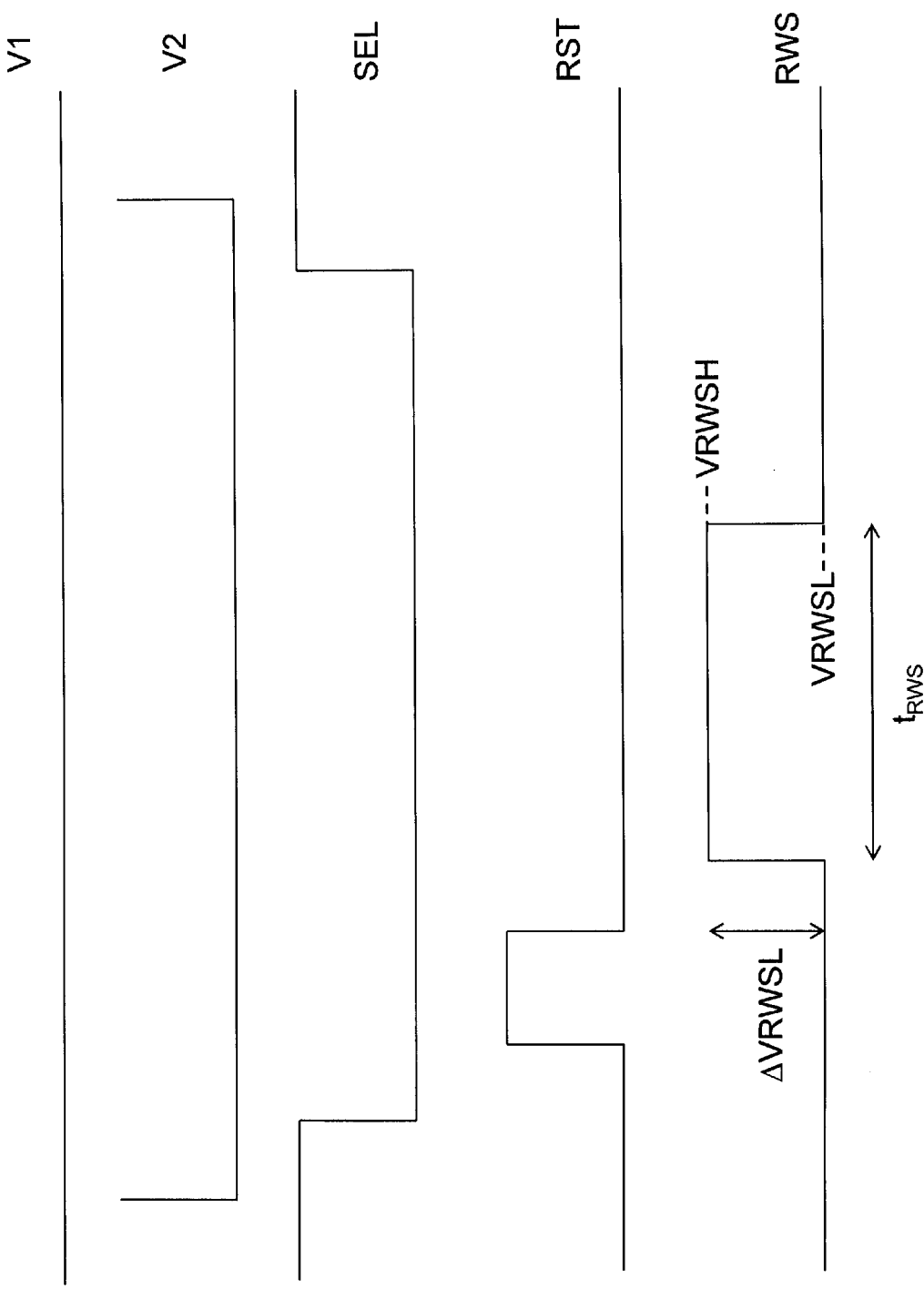
FIG. 11 shows the operating voltages and timings for the operation of the sensor function of the array element circuit of FIG. 5.

A basic method for sensing impedance, such as that described in detail in reference US application 2012/0007608, is summarized as follows and with reference to the timing diagram of FIG. 11:

1. At the start of the sensing operation, both V1 and V2 are set to the same voltage $V_{INI}$. This could correspond to the low level as used for electro-wetting, as shown in FIG. 11, to the high level as used for electro-wetting, or to some other DC level.
2. The select line SEL of the row being sensed is then switched to a low voltage, such that switch transistor 68 is turned off and the array element electrode 38 is electrically isolated from both of voltage signals V1 and V2. The voltage written to the array element electrode 38 (which is stored on active capacitor 58) immediately prior to SEL being taken low may be denoted $V_{INI}$.
3. The reset RST connection is then taken to a high voltage so that second transistor 44 is switched on. As a result the voltage supply VRST is connected through to the gate of first transistor 94 which is charged/discharged to a potential VRST, thus initializing the voltage of this node. The reset RST connection is then taken low again, turning second transistor 44 off.
4. The row select voltage present on the row select line RWS is then taken high, starting at an initial value of VRWSL and ending at a higher value VRWSH and where the change in voltage may be denoted ΔVRWS. After a defined period of time $t_{RWS}$, the row select line RWS voltage is returned to its initial value VRWSL.

The voltage signals supplied to the select line SEL, reset RST connection and row select line RWS are all generated by the row driver circuit 76 such that a common signal is supplied to the respective connections of each array element within the same row of the array.

For the duration of time $t_{RWS}$ for which the RWS pulse is activated, voltages are perturbed at other circuit nodes by magnitudes that depend on the electrical load 56 present at the array element electrode 38 and described as follows:

1. In the case where a conductive droplet 4 is present at the electrode, the electrical load 56A is approximately equal to the capacitance $C_I$ and the voltage at the array element electrode 38 becomes approximately:

$$V = V_{INI} + \Delta VRWS \frac{C_S}{C_S + C_I} \quad \text{(equation 1)}$$

and the voltage at the gate of first transistor 94 becomes approximately:

$$V = VRST + \Delta VRWS \frac{C_S}{C_S + C_I} \frac{C_C}{C_C + C_{PAR}} \quad \text{(equation 2)}$$

where $C_S$ is the capacitance of active capacitor 58, $C_C$ is the capacitance of capacitor 40, and $C_{PAR}$ represents the parasitic capacitance present at the gate of the first transistor 94, for example due to the parasitic capacitance of transistors 94 and 44.

Typically, $C_I > C_S$, and the change in voltage at the gate of first transistor 94 from the initialized value of VRST may be relatively small.

2. In the case where there is no conductive droplet present at the array element electrode 38, the electrical load 56B is approximately the capacitance $C_{gap}$ and the voltage at the array element electrode 38 becomes approximately $$V = V_{INI} + \Delta VRWS \frac{C_S}{C_S + C_{gap}} \quad \text{(equation 3)}$$

and the voltage at the gate of first transistor 94 becomes approximately:

$$V = VRST + \Delta VRWS \frac{C_S}{C_S + C_{gap}} \frac{C_C}{C_C + C_{PAR}} \quad \text{(equation 4)}$$

Since typically $C_S >> C_{gap}$, the voltage perturbation of this node from the initialized value of VRST may be relatively large.

It may be noted that in both cases, the voltage at the gate of first transistor 94 is independent of the voltage $V_{INI}$ initially written to the array element electrode 38. The voltage at the gate of first transistor 94, therefore, determines the extent to which transistor 94 is turned on during the period of the row select voltage pulse, and therefore the magnitude of the output current through first transistor 94. In the case of a liquid droplet 4 being present at the array element electrode 38, the output current through first transistor 94 may be relatively small. In the case where there is no liquid droplet 4 present at the array element electrode 38, the output current through first transistor 94 may be relatively large.

First transistor 94 may be configured as the input device of an amplifier, for example as a source follower, by connecting a suitable resistance between its source and ground. This may be implemented externally to the array element circuit, for example, in a column amplifier circuit as described in reference US application 2012/0007608.

In the case where there is no liquid droplet 4 present at the array element electrode 38, it is found that there are certain circumstances when the load 56 present at array element electrode 38 may differ significantly from the representation of FIG. 8, and the total capacitance may not be $C_{gap}$. In particular, it is found that the load 56 present at array element electrode 38 may be modified if there have been changes made to the electrical properties of the hydrophobic surface 16. Such changes may occur, for example, due to the adhesion of bio-molecules (for example proteins, DNA, etc) to the hydrophobic surface 16 on the occasion of a liquid droplet 4 having at some earlier time traversed the location of the array element. Such bio-molecules may, for example, contain charged chemical species which adsorb to the hydrophobic surface and so modify its electrical properties, or more specifically, increase its conductivity. Such a change in the conductivity of the hydrophobic surface 16 may also change the electrical load 56, since it may influence the lateral fringing capacitance between neighboring array elements in the array.

Accordingly, it is possible, and in some cases desirable, to detect such changes in the electrical properties of the hydrophobic surface using the sensor function of the AM-EWOD. However, with the conventional array element circuit described in background reference US application 2012/0007608, it is found to be difficult to do so with much sensitivity. The main reason for this is that capacitor $C_S$ is too large to facilitate detection of the much smaller changes in capacitance associated with changes to the hydrophobic surface. When choosing component sizes for the array element circuit 84, an optimum size of capacitor $C_S$ is found typically to be a little smaller, but of the same order of magnitude, as the size of $C_I$. Such a value of $C_S$ (which may be typically be in the range of several hundred femto-Farads to a few pico-Farads) is too large to facilitate detection of the much smaller changes in capacitance associated with changes to the hydrophobic surface 16. This can easily be appreciated with reference to equation (4); $C_S$ is much bigger than $C_{gap}$, (which may be typically a few, or a few tens of femto-Farads), and so changes in the value of $C_{gap}$ that are of the order of magnitude as $C_{gap}$ result in an almost negligible change in the voltage at the gate of first transistor 94. The conventional array element circuit described in background reference US application 2012/0007608 is therefore not very sensitive in the small changes of the load 56 associated with changes to the hydrophobic surface 16.

In accordance with the present invention, as referenced above the capacitor 58, forming capacitance $C_S$, is realized as an active (semiconductor) capacitor. As a result, the value of capacitance $C_S$ may be varied by modifying the DC voltage between its plates. This may be achieved by either of the following two methods:

1. Modifying the DC level of the voltage signal applied to RWS, or
2. Modifying the value of $V_{INI}$.

In the following we assume that method 1, modifying the DC level of the voltage signal RWS is that which is employed. Later described is how method 2, modifying the value of $V_{INI}$, could be used instead.

Figure 12:
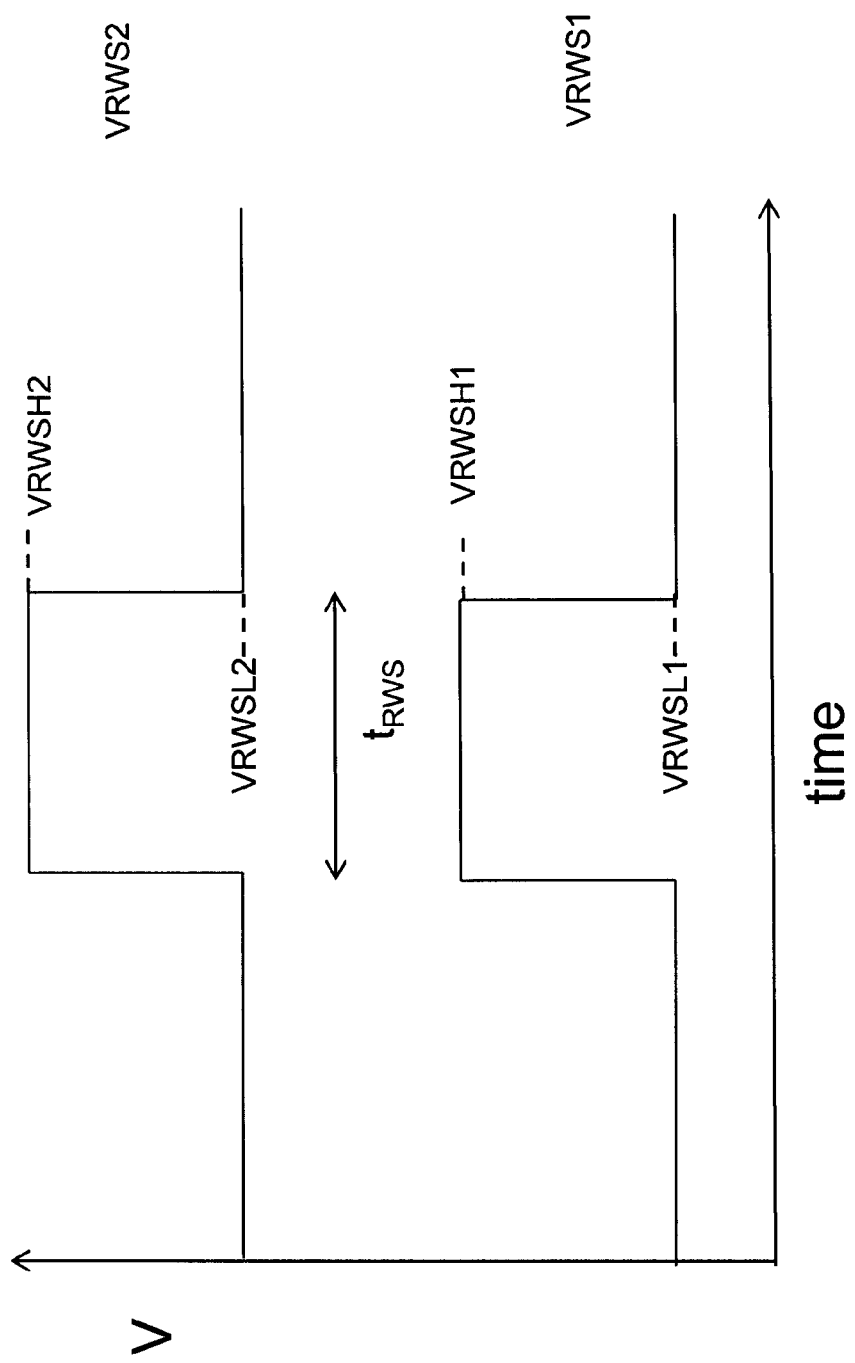
FIG. 12 shows the voltage levels of the row select pulse in accordance with a dual mode operation of a first embodiment of the exemplary AM-EWOD device.

Example voltage waveforms that may be applied to the RWS connection are shown in FIG. 12.

An exemplary case is when active capacitor 58 is comprised of n-type semiconductor material with threshold voltage Vth. The capacitance $C_S$ of active capacitor 58 may be switched between two values so as to operate in either one of at least a first mode of sensitivity, such as a normal (low sensitivity), or a second mode of sensitivity, such as a high sensitivity mode, as follows.

To operate in normal (i.e. of lower sensitivity) mode, the voltage pulse VRWS1 is applied (FIG. 12), where the low level is VRWSL1 and the high level is VRWSH1. These voltage levels may be chosen such that $$VRWSH1-VRWSL1=\Delta VRWS \quad \text{(equation 5a)}$$

and $$V_{INI}-VRWSH > Vth. \quad \text{(equation 5b)}$$

As a consequence, the voltage between the plates of the active capacitor 58 will always exceed Vth, and as a result the capacitance $C_S$ will equal $C_{ACCUM}$. The capacitor $C_S$ may be designed such that $C_{ACCUM}$ is a value optimized to give a good range of operation for sensing droplet capacitance. Typically, $C_{ACCUM}$ may be designed to be between 10% and 100% of the value of $C_I$. The normal mode of operation is found to be particularly suitable for detecting the presence or absence of liquid droplets, and for measuring the fraction of the array element electrode 38 covered by a liquid droplet 4.

To operate in high sensitivity mode, the voltage pulse VRWS2 is applied (FIG. 12), where the low level is VRWSL2 and the high level is VRWSH2. These voltage levels may be chosen such that $$VRWSH2-VRWSL2=\Delta VRWS \quad \text{(equation 6a)}$$

and $$V_{INI}-VRWSL < Vth. \quad \text{(equation 6b)}$$

As a consequence, the voltage between the plates of the active capacitor 58 will always be less than Vth and as a result the capacitance of $C_S$ will be equal to $C_{DEP}$. Typically $C_{DEP}$ may be designed to be a small fraction of the value of $C_{ACCUM}$, ten percent (10%) or less. When the circuit functions in this mode of operation, it is therefore much more sensitive to small changes in the load 56 present at the array element electrode 38, as is apparent from inspection of equation 4 above. The high sensitivity mode of operation is therefore found to be particularly well suited to sensing small changes in the load 56, for example due to modification of the properties of the hydrophobic surface 16.

It will be apparent to one skilled in the art how the DC offset of the voltage pulse applied to the row select connection can be modified by any one of a number of standard means, for example by using a resistor bridge circuit or by using standard level shifting circuits. These may optimally be implemented externally to the array element, for example in the row driver circuit 76.

In accordance with such features, generally the sensor circuitry includes an active element, and a capacitance across the active element is different in the first mode of sensitivity as compared to the second mode of sensitivity. The AM-EWOD device further includes a row select line RWS that inputs a voltage to the active element, wherein the mode of the sensor circuitry is set based on a voltage level of the row select line. In particular, the capacitance across the active element is switched as between the first mode and the second mode by switching the voltage level of the row select line. In this regard, the capacitance across the active element is determined based on a voltage difference between the voltage level of the row select line RWS and the voltage level of an electro-wetting drive electrode 38 of the array element.

Thus, the capacitance across the active element is different in the first (normal or low) mode of sensitivity as compared to the second (high) mode of sensitivity. The active element may be an active capacitor. In the first mode of sensitivity the active capacitor has a first capacitance, and in the second mode of sensitivity the active capacitor has a second capacitance, wherein the first capacitance is greater than the second capacitance.

Figure 13:
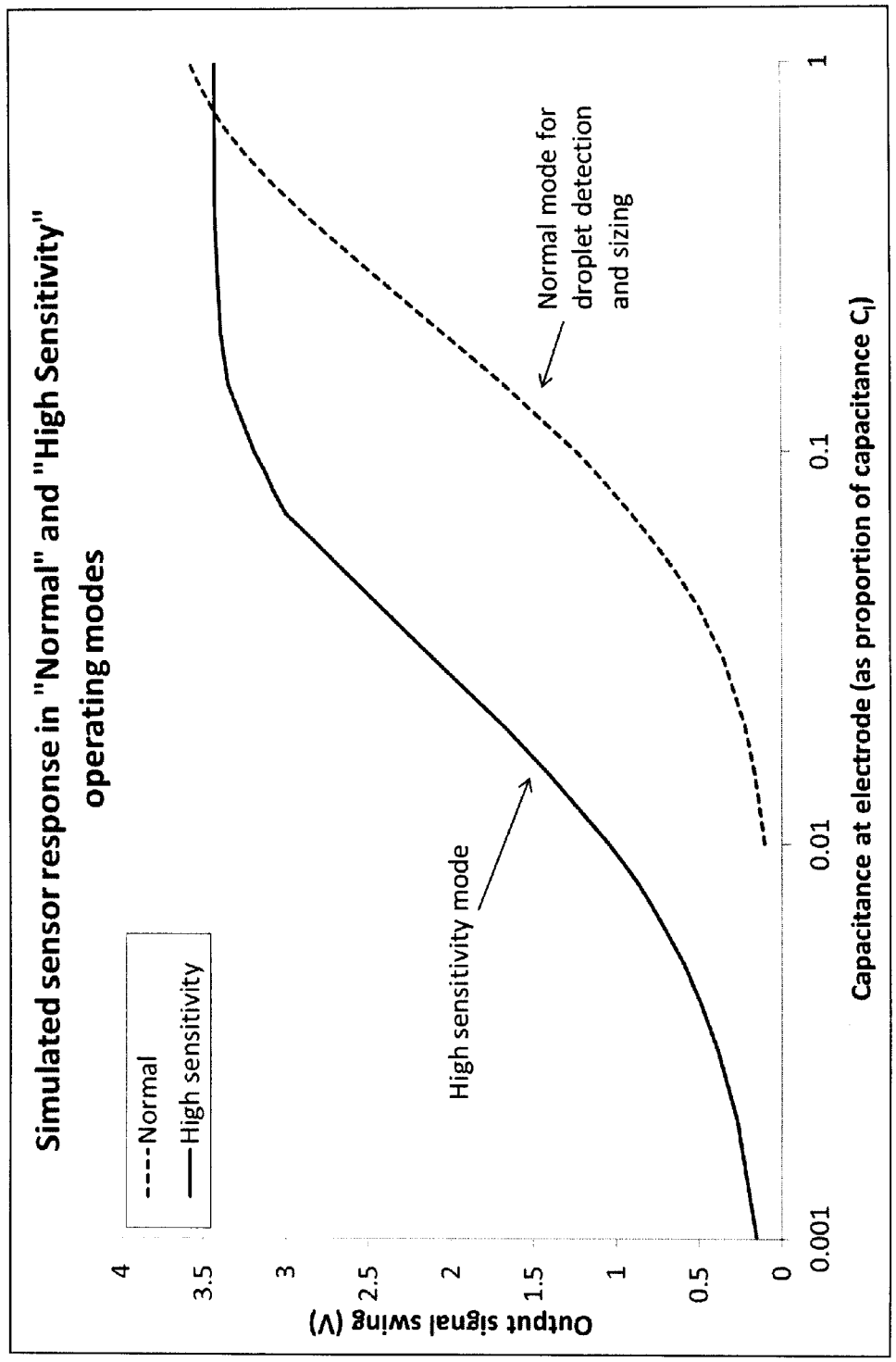
FIG. 13 shows an example simulation result of a first embodiment of the exemplary AM-EWOD device.

FIG. 13 shows an example simulation result of the sensor operation of the array element circuit. In this simulation, the capacitive load 56 present at the array element electrode 38 was varied, and the sensor output voltage (at the source of frist transistor 94) was calculated as a function of the load capacitance. The load capacitance on the x-axis is shown represented as a fraction of capacitance $C_I$. The values of active capacitor 58 capacitance in accumulation and depletion mode (i.e. $C_{ACCUM}$ and $C_{DEP}$ respectively) have been selected such that normal mode is suitable for detecting the fraction of any liquid droplet 4 present at the array element electrode 38, and the high sensitivity mode is capable of detecting much smaller capacitances.

It may be noted that the voltage conditions for correct operation of each of the normal and high sensitivity modes are a function of the initialization voltage $V_{INI}$. It may be found to be convenient to write $V_{INI}$ to a single value for all array elements, irrespective of the data written to the memory 88 of the array element circuit. The motivation for this may be to reduce the step in voltage (VRWSL2−VRWSL1) between the two operating modes, consistent with correct operation of all values of $V_{INI}$. $V_{INI}$ may be initialized to a constant value by setting the voltage level of both V1 and V2 to the same DC level immediately prior to the SEL voltage input being taken low, and restoring V1 and V2 to their usual levels (commensurate with EWOD actuation) after SEL is again taken high. Performing this action has the slight disadvantage of turning off the EWOD actuation voltage during the sensing operation, but this is found to have negligible effect on droplet actuation since the time required for the sensing operation is generally quite short, typically being tens of micro-seconds. This disadvantage is therefore insignificant.

As previously described, the capacitance of the active capacitor 58 is determined by the voltage between its terminals. In the above description of the operation of the sensor, this voltage difference is varied between the two modes of operation by adjusting the DC offset voltage of the voltage signal applied to the row select (RWS) signal (method 1). As previously noted, it would also be possible to influence the voltage across the active capacitor 58 by changing the value of $V_{INI}$ (method 2), which comprises an alternative method of changing between the normal and high sensitivity modes of operation of the circuit. More specifically, the capacitance of the active capacitor 58 may be adjusted between the normal and high sensitivity modes of operation by varying the value of $V_{INI}$ between the normal and high sensitivity modes, while leaving the high and low levels of the RWS voltage signal, VRWSH and VRWSL respectively, the same for both modes of operation.

In this case the normal mode would be realized by setting $V_{INI}$ to a value $V_{INIH}$ chosen such that:

$$V_{INIH} > Vth + VRWSH \quad \text{(equation 7)}$$

and the high sensitivty mode is realised by setting VINI to a value VINIL chosen such that:

$$V_{INIL} < Vth + VRWSL \quad \text{(equation 8)}$$

The advantage of the invention and of this embodiment is that both voltage actuation circuitry and a dual range mode of impedance sensor have been realized within the device.

The droplet actuation circuitry may be used to manipulate one or more liquid droplets within the array in an arbitrary fashion commensurate with the operation of a standard AM-EWOD device as described in background art references.

In the normal or low sensitivity mode, the sensor is very suitable for sensing and detecting the presence or absence of liquid droplets 4 at the location of the array element electrode 38. The provision of a droplet sensor function is very advantageous and has a number of practical applications. For example, the droplet sensor function may be used for determining the positions of one or more droplets within the array. The droplet actuation circuitry may therefore be made to operate in combination with feedback from the sensor function. Droplet operations (such as moving or splitting) may therefore be programmed by the application of appropriate data voltage patterns, and the droplet sensor then used to verify that the desired operation had indeed been implemented correctly. A further application of the sensor function is that it may be used to measure the size of liquid droplets. This may be achieved due to the analogue nature of the sensor whereby it is possible to detect what fraction of an array element is contacted by the whole or a part of a liquid droplet. Furthermore, suitable mathematical algorithms may be implemented in a computer program receiving and processing the output sensor data. Such algorithms may for example integrate the total sensor response over a number of contiguously adjacent array elements corresponding to the footprint occupied by a liquid droplet 4 and therefore determine the total contact area of the liquid droplet 4 with the hydrophobic layer 26. The size of the liquid droplet 4 can thus be determined.

In addition to operating in the normal or low sensitivity mode, the sensor function may be configured to operate in an additional high sensitivity mode as described. In the high sensitivity mode, the sensor is much more sensitive to small capacitance changes at the array element electrode 38. In this mode the sensor is therefore very suitable for detecting changes to the electrical properties of the hydrophobic surface 16 in the absence of a liquid droplet. Such changes in electronic properties may occur, for example, due to the adsorption of bio-molecules onto the hydrophobic surface 16. Further example applications and advantages of the high sensitivity mode are described in later embodiments.

A further advantage of this embodiment is that the dual range functionality (i.e. a sensor having both high sensitivity and low sensitivity modes) has been implemented into each element of the array element circuit 84 without the addition of any extra circuit components into the array element circuit 84. The only additional design complexity is in the design of the row driver circuit 76 supplying the RWS pulse, which is of standard means and trivial to implement. This advantage is very significant since it is highly desirable to minimize the number of circuit components in the array element circuit 84, to minimize array element layout footprint and maximize device reliability and manufacturing yield.

Minimizing the number of circuit components within the array element circuit 84 allows the physical layout area occupied by the circuit to be kept reasonably small (for example 200 µm by 200 µm) for an example design of the circuit in a standard TFT process. This is in turn makes it possible to realise an array of high spatial resolution. One advantage of this is that the minimum size of a liquid droplet that can successfully be manipulated is approximately that of the array element. By keeping the array element size small, the minimum droplet size is also therefore small. This may have advantages for certain applications including DNA multiplication by digital polymerase chain reaction (digital-PCR) or the manipulation and cultivation of single cells within liquid droplets.

A further advantage is that the device may be designed so as to be switchable between the normal and high sensitivity modes of operation, for example by changing the state of a logic control pulse.

It will be apparent to one skilled in the art that many variants can be implemented to the array element circuit 84. For example, it would be possible to reverse the terminals of the active capacitor 58 so that a row select pulse VRWS2 would implement the normal mode of operation, and VRWS1 the high sensitivity mode. Similarly, it would be possible to implement active capacitor 58 as a p-type active capacitor as already described.

It will further be appreciated that the high and low levels of the voltage pulse VRWS may also be chosen such that Vth lies between VRWSL and VRWSH. In this case the capacitance of the active capacitor 58 will vary in accordance with the voltage across it as the voltage level on RWS changes. In this case the effective value of the capacitance will be $C_{SO}$, a value somewhere in-between $C_{DEP}$ and $C_{ACCUM}$. The value of $C_{SO}$ will depend on both $C_{DEP}$, $C_{ACCUM}$, the voltage levels VRWSL and VRWSH, the threshold voltage Vth and the steepness of the transistion of the capacitance versus voltage characteristic between $C_{DEP}$ and $C_{ACCUM}$. Such a choice of voltage levels may be used to realise one a third, intermediate sensitivity range with the voltage at the gate of the first transistor being described by equation (4) with $C_S = C_{SO}$.

Figure 14:
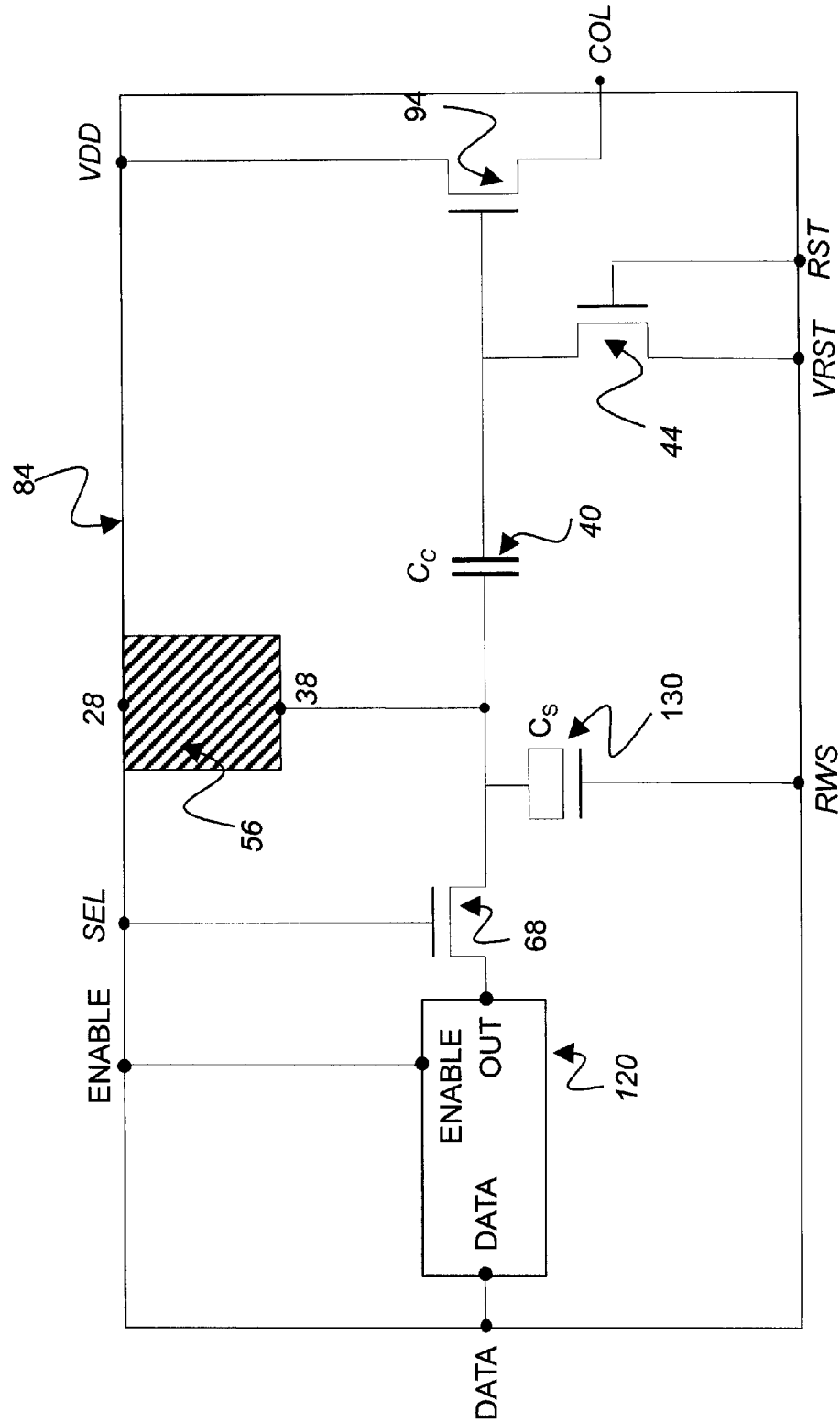
FIG. 14 shows a second embodiment of an exemplary array element circuit of the exemplary AM-EWOD device.

The array element circuit 84 of a second embodiment of the invention is shown in FIG. 14. This embodiment is comparable to the first embodiment except that an alternative element is employed as the active element. Specifically, for the active element the active capacitor 58 has been replaced by an n-type transistor 130. The n-type transistor 130 is connected such that the source and drain are both connected to the array element electrode 38 and the gate is connected to the row select pulse RWS. The array element circuit 84 of the second embodiment operates in exactly the same manner as the corresponding circuit of the first embodiment, with transistor 130 performing the function of an active capacitor. When the difference in voltage between the gate terminal and the source/drain terminals of transistor 130 exceeds Vth, the channel of the transistor 130 is accumulated with charge carriers and the capacitance between the gate and the source/drain terminals has a first capacitance value $C_{ACCUM}$. Alternatively, when the difference in voltage between the gate terminal and the source/drain terminals is less than Vth, the channel of transistor 130 is depleted of charge carriers and the capacitance between the gate and the source drain terminals has a second capacitance value $C_{DEP}$, with first capacitance value $C_{ACCUM}$ being greater than the second capacitance value $C_{DEP}$. The size and relative sized of $C_{ACCUM}$ and $C_{DEP}$ may both be scaled by scaling the length L and width W of transistor 130, with $C_{ACCUM}$ scaling approximately linearly with the product of L and W and $C_{DEP}$ scaling approximately linearly with W.

An advantage of this embodiment is that the array element circuit has been implemented with entirely standard components typically available in a thin film design process. It will be apparent to one skilled in the art that variant designs of this embodiment are also possible, for example the n-type transistor 130 could also be realized as a p-type device.

Figure 15:
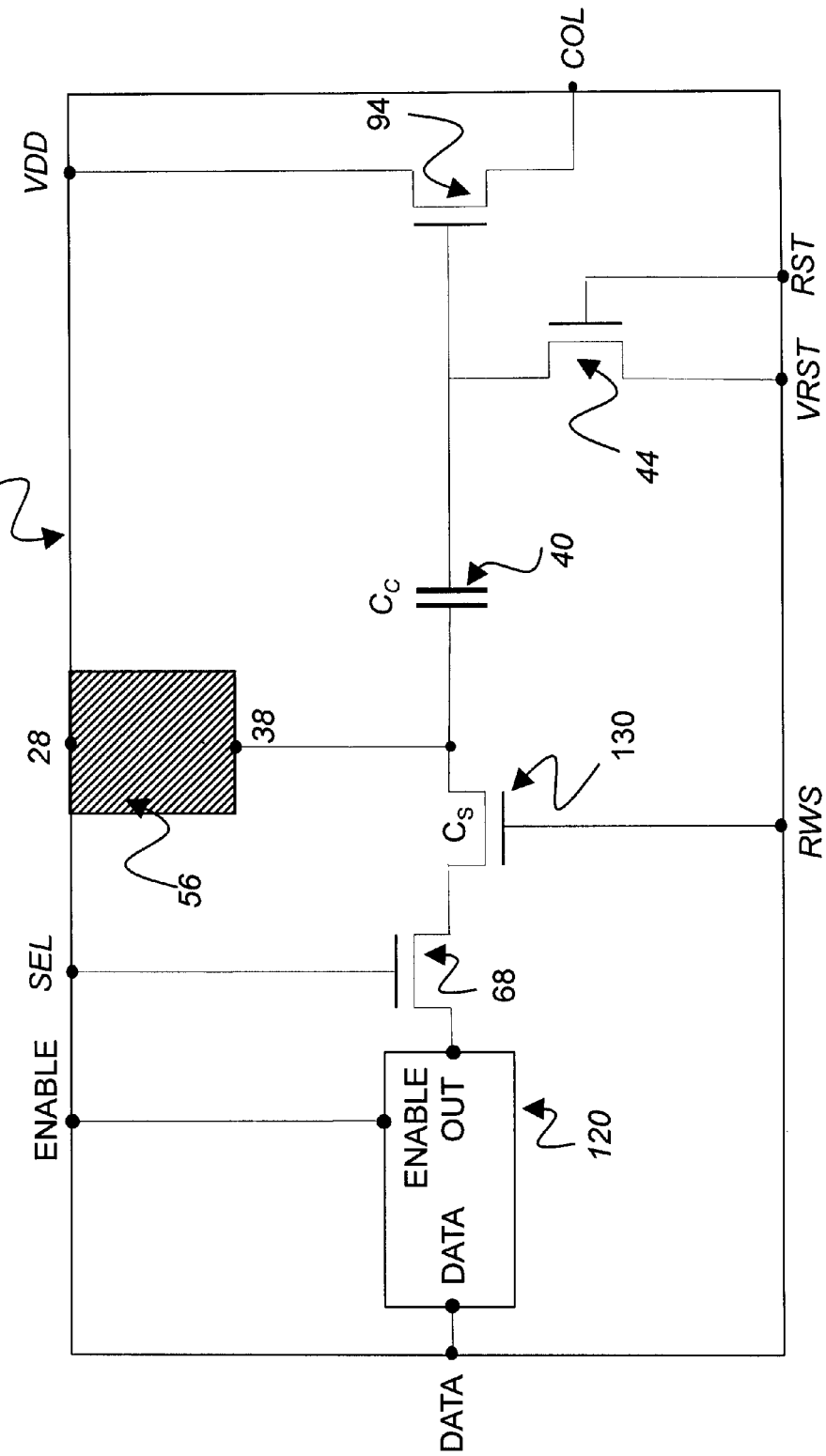
FIG. 15 shows a third embodiment of an exemplary array element circuit of a the exemplary AM-EWOD device.

The array element circuit of a third embodiment of the invention is shown in FIG. 15. This embodiment is comparable to the second embodiment except that the n-type transistor 130 is connected slightly differently. The drain of transistor 130 is connected to the array element electrode 38 and the source of transistor 130 is connected to the drain of switch transistor 68. The operation of the array element circuit of this embodiment is essentially identical to that of the second embodiment, with transistor 130 once again performing the function of an active capacitor. It may be noted that at both the start and the end of the RWS voltage pulse, the source and drain of transistor 130 assume approximately the same potentials, so that the operation of transistor 130 as an active capacitor is essentially the same as was described for the second embodiment of the invention.

However, an advantage of this embodiment is that when transistor 130 is turned off so that its channel is depleted of charge carriers, a smaller value of depletion capacitance $C_{DEP}$ is realized between the gate of transistor 130 and the array element electrode 38 than was the case for the second embodiment. This is because the component of capacitance between the gate and drain of transistor 130 no longer contributes to the depletion capacitance $C_{DEP}$ between the gate and source of transistor 130, the drain and source of transistor 130 being electrically isolated from one another in the high sensitivity mode when the transistor 130 is turned off. This is advantageous, since it may be desirable in certain applications to maximize the ratio $C_{ACCUM}/C_{DEP}$ and so maximize the sensitivity of the high sensitivity mode of operation.

Figure 16:
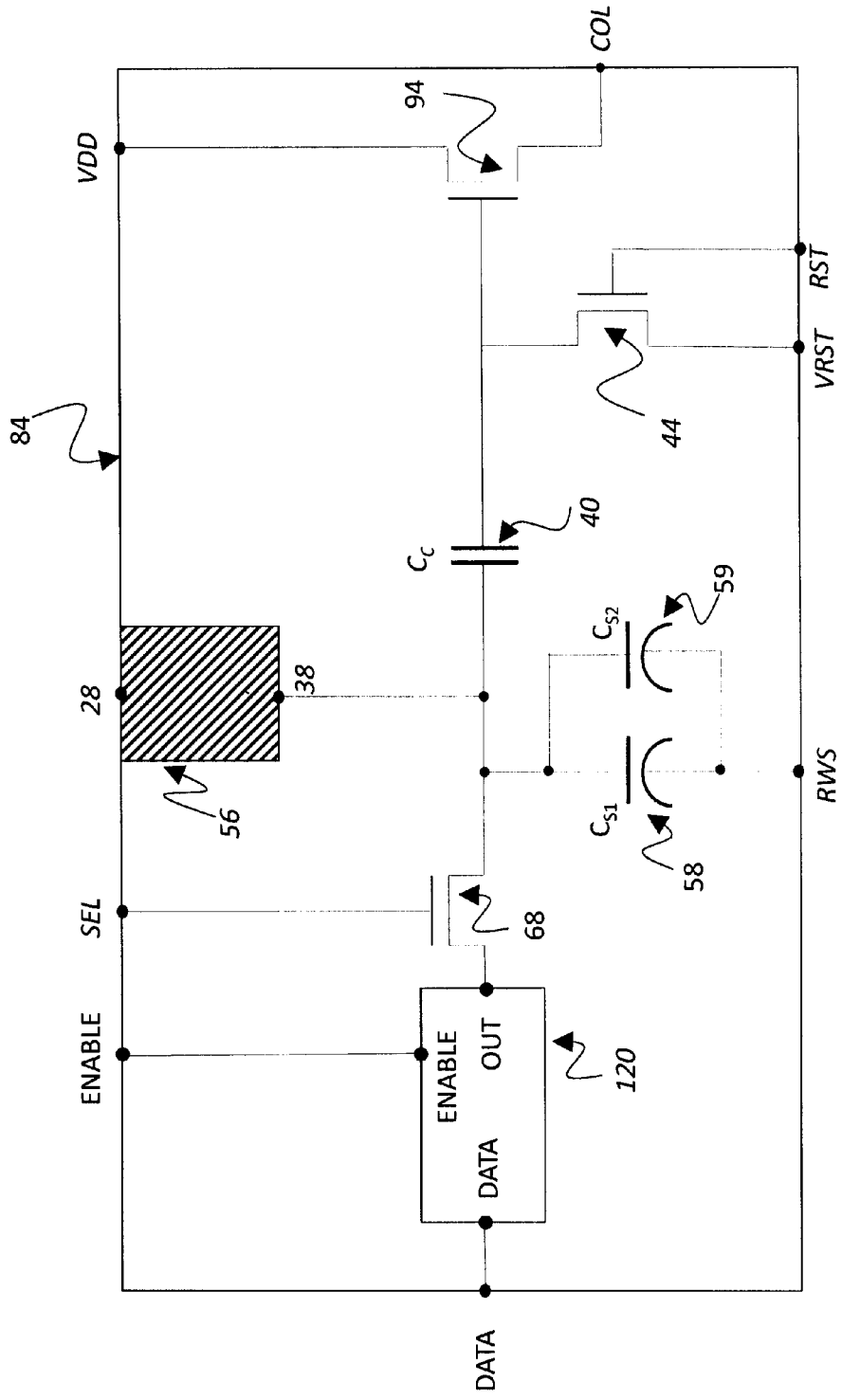
FIG. 16 shows a fourth embodiment of an exemplary array element circuit of the exemplary AM-EWOD device.

The array element circuit of a fourth embodiment is shown in FIG. 16. This is as the first embodiment, except that an additional active capacitor device 59 $C_{S2}$ is connected between the array element electrode 38 and the RWS connection. The total capacitance in this case is given by $C_{ST}=C_{S1}+C_{S2}$.

The second active capacitor 59 $C_{S2}$ may be realized to have both capacitances when in accumulation and depletion and also a different threshold voltage Vth2 to the first active capacitor 58. The different accumulation and depletion capacitances, $C_{ACCUM2}$ and $C_{DEP2}$ respectively, may be realized by designing the area of the second active capacitor 59 to be different to the area of the first active capacitior. The different threshold voltage Vth2 of the second active capacitor 59 may be realised by using a different concentration of dopant ions in the channel of the device.

Figure 17:
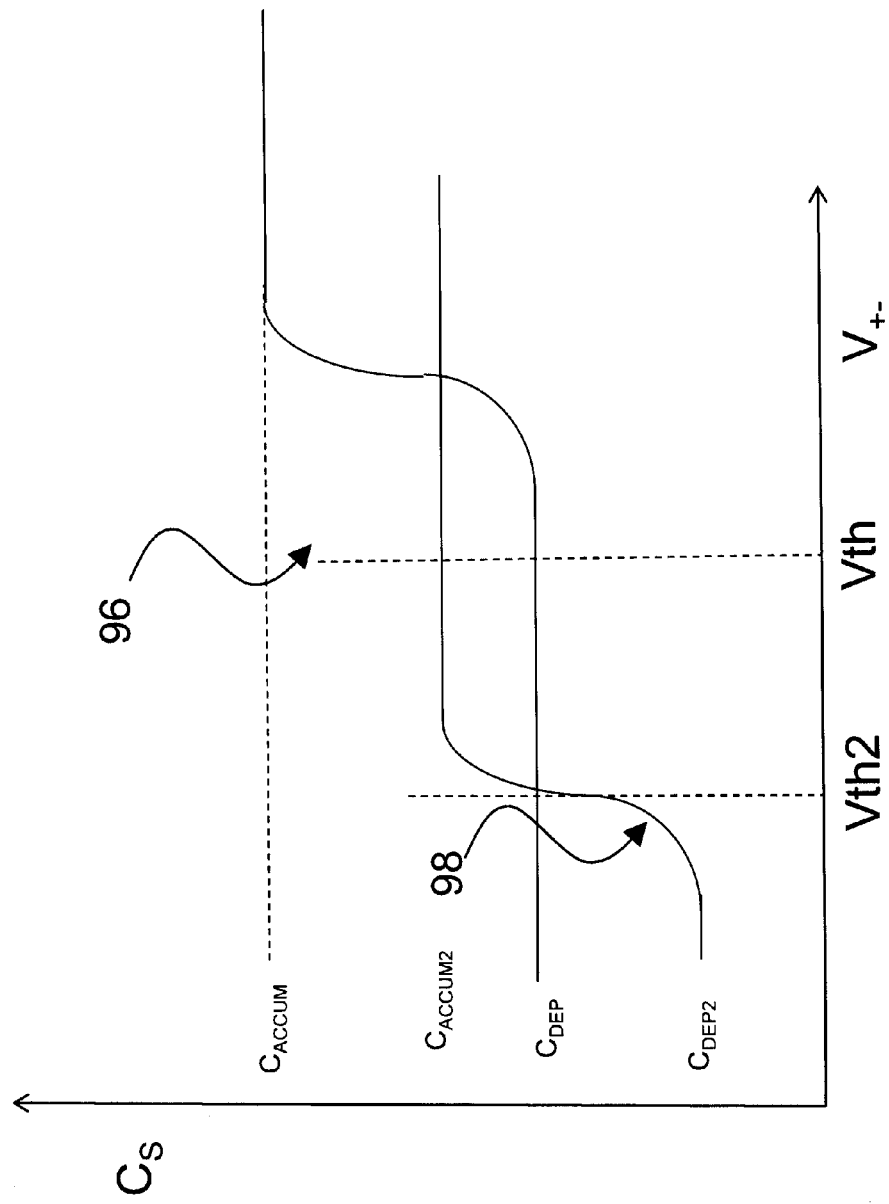
FIG. 17 shows example capacitance versus voltage characteristics of an active capacitor circuit component and a second active capacitor circuit component.
Figure 18:
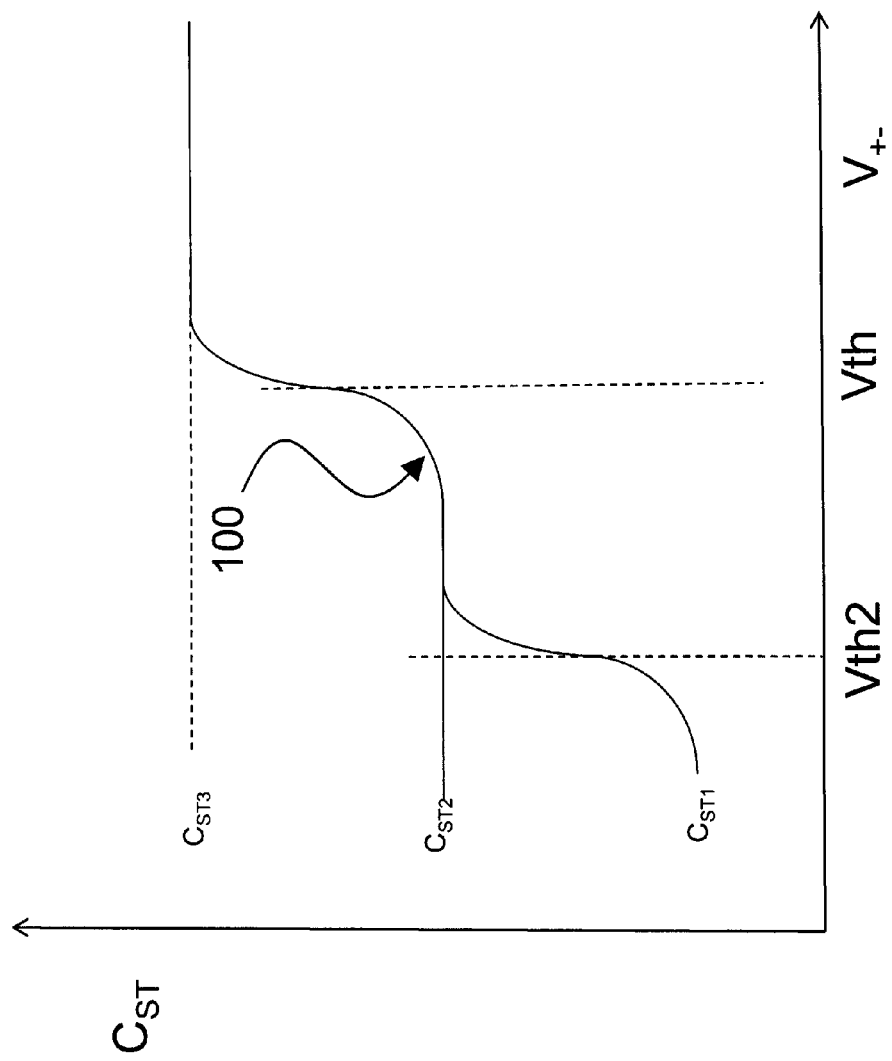
FIG. 18 shows example capacitance versus voltage characteristics of two active capacitor circuit components arranged in parallel.

FIG. 17 shows example capacitance versus voltage characteristics of the active capacitor device 58 and the second active capacitor device 59. The capacitance versus voltage characteristic of the total capacitance $C_{ST}$ of the parallel combination of the two capacitors is shown in FIG. 18. It will be noted that the total capacitance $C_{ST}$ assumes one of three different values in accordance with the voltage across it. The value of the total capacitance in each range is approximately $C_{ST3}=C_{ACCUM}+C_{ACCUM2}$ if V>Vth
$C_{ST2}=C_{ACCUM2}+C_{DEP}$ if Vth2<V<Vth
$C_{ST1}=C_{DEP2}+C_{DEP}$ if V<Vth2.

Figure 19:
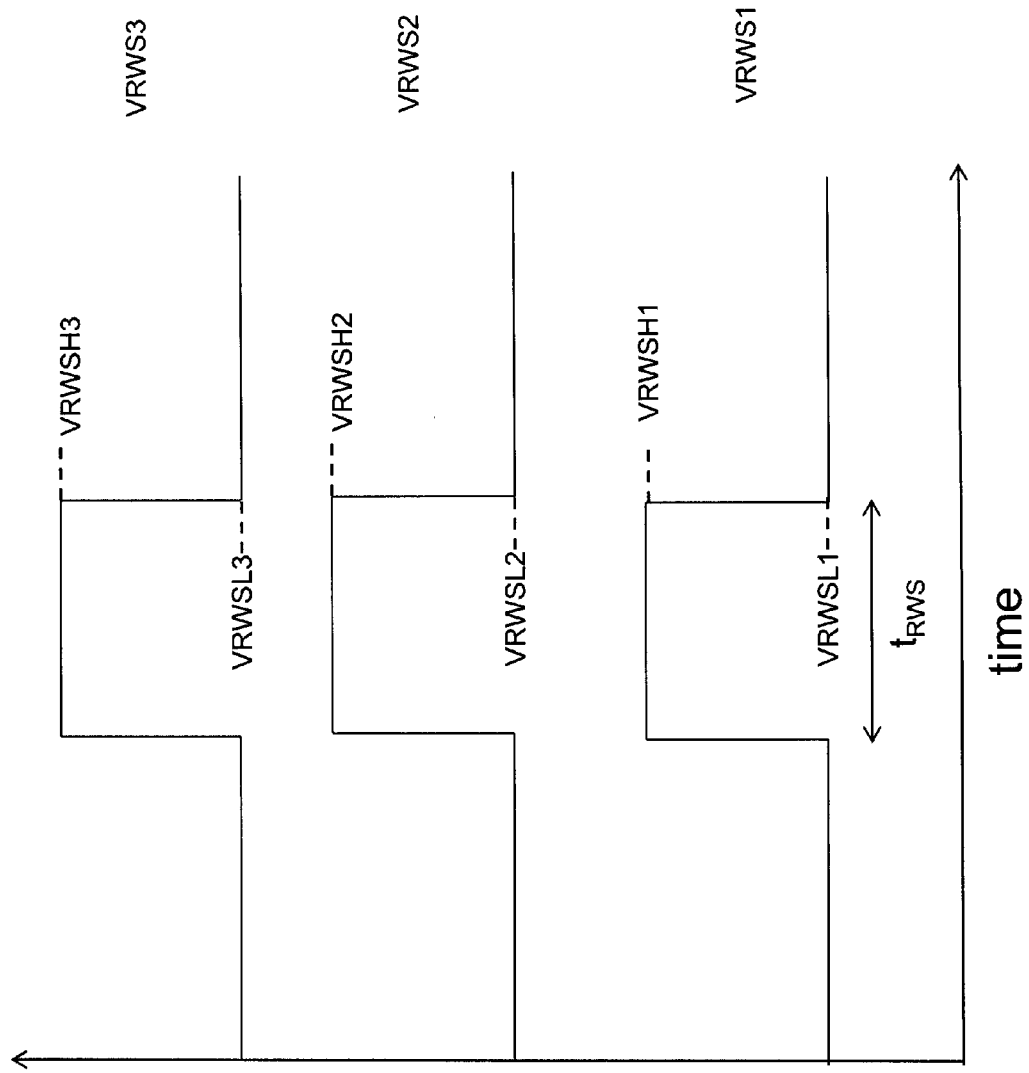
FIG. 19 shows the voltage levels of the row select pulse in accordance with a fourth embodiment of the exemplary AM-EWOD device.

The operation of the fourth embodiment is as described for the first embodiment except that by appropriate choice of the voltage signals applied to RWS, the sensor may be made to operate in one of three sensitivty ranges. FIG. 19 shows possible implementations of the RWS voltage signal according to these three operating ranges.

In a first, lowest, sensitivity range the voltage signal applied to RWS is VRWS3, having low level VRWSL3 and high level VRWSH3. These voltage levels may be arranged such that VRWS3L>Vth2. Thus for operation in this range, $C_{ST}$ is set to a relatively high value (=$C_{ST3}$) and the sensor is optimized to sense relatively large changes in capacitance In a second, intermediate, sensitivity range the voltage signal applied to RWS is VRWS2, having low level VRWSL2 and high level VRWSH2. These voltage levels may be arranged such that VRWSH2<Vth and VRWSL2>Vth2. Thus for operation in this range, $C_{ST}$ is set to an intermediate value (=$C_{ST2}$) and the sensor is optimized to sense moderately small changes in capacitance.

In a third high, sensitivity range the voltage signal applied to RWS is VRWS1, having low level VRWSL1 and high level VRWSH1. These voltage levels may be arranged such that VRWSH1<Vth2. Thus for operation in this range, $C_{ST}$ is set to a low value (=$C_{ST1}$) and the sensor is optimized to sense small changes in capacitance.

According to the design of active capacitor devices 58 and 59, the capacitance levels $C_{ST1}$, $C_{ST2}$ and $C_{ST3}$ may be arranged to be an order of magnitude or so different from each other.

An advantage of this embodiment is that three ranges of sensitivity have been realized. This may be advantageous in implementations whereby it is desirable to operate the sensor so as to detect capacitance changes over a very wide range. This may be the case for example if the high sensitivity range of operation is optimized to detect very small changes in capacitance, for example due to low levels of bio-molecule adsorption onto the hydrophobic surface. In this case it may be advantageous to realize a third mode of operation having an intermediate sensitivity range between the first and second modes of sensitivity described above, to be used for example to detect high levels of bio-molecule adsorption onto the hydrophobic surface.

A general method of operating an active matrix electrowetting on dielectric (AM-EWOD) device may be as follows. The method may include the following steps: first applying a first voltage to a row select line of an array element; setting sensor circuitry of the array element to operate in a first mode of sensitivity based on the first voltage; applying a second voltage to the row select line; and setting the sensor circuitry of the array element to operate in a second mode of sensitivity based on the second voltage. The first mode of sensitivity may have a low sensitivity range and the second mode of sensitivity has a high sensitivity range relative to the first mode of sensitivity. In the first mode of sensitivity, the device may detec with the sensor circuitry a liquid droplet on a hydrophobic surface of an array element, and in the second mode of sensitivity, the device may detect with the sensor circuitry a change in the electrical properties of the hydrophobic surface of the array element.

Figure 20:
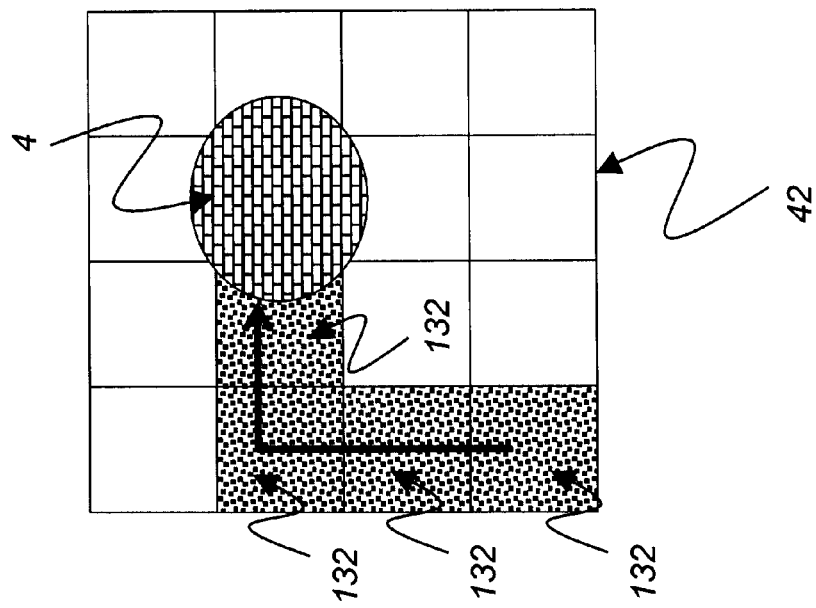
FIG. 20 shows the operation of the exemplary AM-EWOD device in an example associated with detecting bio-fouling.

More specific examples of usage are now described. FIG. 20 depicts the manner by which the AM-EWOD device of any of the previous embodiments may be employed in a high sensitivity mode of operation used to detect bio-fouling of the hydrophobic surface 16. It may be found that if the liquid droplet 4 contains bio-molecules, and in particular proteins, some of the bio-molecules may be adsorbed onto the hydrophobic surface along the path through the device which the droplet traverses. This is shown in FIG. 20, illustrating the movement of a liquid droplet 4 containing bio-molecules through the array 42. The movement of the droplet 4 is indicated by the arrow, and those array elements above which the droplet had previously resided may have a contaminated hydrophobic surface 132 due to the adsorption of bio-molecules on the hydrophobic surface 16 in these locations. According to the operation of this example, the sensor may be used in normal mode to determine the location of the droplet and its variation in time. The sensor may also be used in the high sensitivity mode to detect and quantify the extent of bio-fouling of the hydrophobic surface 16. According to whether or not bio-fouling is detected, future droplet 4 operations through the device may be dynamically reconfigured. For example, it may be decided that bio-fouled surfaces should not be used in subsequent droplet operations in accordance with requirements to avoid cross-contamination.

A further application relating to the detection of bio-fouling relates to the fact that in certain circumstances it may be possible to clean contaminated surfaces. For example, by moving a liquid droplet 4 containing a cleaning fluid through the array 42 and traversing the locations of the contaminated hydrophobic surface 132, cleaning the bio-fouled portions of array 42 may be performed. A suitable cleaning fluid may, for example, contain surfactant and/or enzyme molecules. The effect of the cleaning fluid may be to re-absorb contaminant bio-molecules, and thus restore the hydrophobic surface 16 to its original condition.

Such a cleaning operation may be carried out in conjunction with the operation of the sensor, operating in high sensitivity mode. Since the sensor is capable of detecting the presence or absence of bio-molecules adsorbed onto the hydrophobic surface 16, it may thus be used for quantifying the efficacy of the cleaning process, and verifying that following the cleaning process the hydrophobic surface 16 has been restored to its original condition.

The advantages shown by this example are that by detecting and quantifying bio-fouling in the device, cross-contamination may be minimized or avoided by appropriate re-routing of droplet pathways through the device in subsequent operations. A further advantage of this embodiment is that the efficacy of surface cleaning protocols may be monitored or verified.

FIG. 21 depicts the manner by which the AM-EWOD device of any of embodiments 1-3 may be employed such that the sensor is used to detect the deliberate binding of bio-molecules onto the surface. According to this example, in the normal mode of operation the sensor may function as a droplet sensor for detecting the location and size of liquid droplets 4 within the array 42 as previously described, whilst in high sensitivity mode the sensor may function as a bio-sensor.

As depicted in FIG. 21, two liquid droplets 4A and 4B are manipulated within the array 42, and may be merged together as indicated by the direction of the arrows. The droplets may, for example, undergo a reaction (which may be chemical or bio-chemical in nature) at the location of coalescence at a reaction site 134. The reaction taking place may be such that chemical or biochemical species are produced, which subsequently adsorb onto the hydrophobic surface 16 thus modifying its electrical properties. The sensor circuit of the array element circuit 84 located at the reaction site 134 may then be used to quantify a property of the reaction that has taken place by measuring the change in the load 56 present at the array element of the reaction site 134.

The advantage of this example is that the sensor may therefore function as a chemical sensor or as a bio-sensor. By operating in the high sensitivity mode, the sensitivity may be greatly enhanced in comparison to the normal mode of operation for the same reasons as have previously been described.

In another exemplary embodiment particularly suitable for the sensing of FIG. 22, the hydrophobic surface 16 of the substrate 72 may be functionalized with bio-receptors 136 in the location of the reaction site 134. The bio-receptors may include any known types of bio-sensor (for example functionalized DNA fragments, antibodies, antigens, aptamers, etc.) and may be designed to bind specifically to a particular bio-molecule, for example a specific antibody, antigen or protein, etc. The occurrence of the reaction may result in the formation of a specific bio-chemical species, which in turn gets bound by the bio-receptors 136 in the location of the reaction site 134. The overall result is that the electrical load 56 presented at the array element electrode 38 is modified by the capture of bio-molecules by the bio-receptors 136, and this may then be sensed by the sensor circuit operating in high sensitivity mode. An advantage of this implementation is that the bio-sensor may be made specific to the detection of certain bio-molecules of interest.

It will be further apparent that the AM-EWOD device described could form part of a complete lab-on-a-chip system as described in background section references. Within such as system, the droplets sensed and/or manipulated in the AM-EWOD device could be chemical or biological fluids, e.g. blood, saliva, urine, etc, and that the whole arrangement could be configured to perform a chemical or biological test or to synthesize a chemical or biochemical compound.

In accordance with the above description, an aspect of the invention is an active matrix electrowetting on dielectric (AM-EWOD) device. The AM-EWOD device includes a plurality of array elements configured to manipulate one or more droplets of fluid on an array, each of the array elements including a corresponding array element circuit, Each array element circuit includes write circuitry configured to write data to the corresponding array element for controlling the manipulation of the one or more droplets of fluid, and sensor circuitry configured to sense an impedance present at the corresponding array element. The sensor circuitry is configured to operate in one of at least a first mode or a second mode, the different modes each having different sensitivity ranges.

In an exemplary embodiment of the AM-EWOD device, the sensor circuitry includes an active element, and a capacitance across the active element is different in the first mode of sensitivity as compared to the second mode of sensitivity.

In an exemplary embodiment of the AM-EWOD device, the device further includes a row select line that inputs a voltage to the active element, wherein the mode of the sensor circuitry is set based on a voltage level of the row select line.

In an exemplary embodiment of the AM-EWOD device, the capacitance across the active element is switched as between the first mode and the second mode by switching the voltage level of the row select line.

In an exemplary embodiment of the AM-EWOD device, the capacitance across the active element is determined based on a voltage difference between the voltage level of the row select line and a voltage level of an electro-wetting drive electrode of the array element.

In an exemplary embodiment of the AM-EWOD device, the active element is an active capacitor, In the first mode of sensitivity the active capacitor has a first capacitance and in the second mode of sensitivity the active capacitor has a second capacitance, and the first capacitance is greater than the second capacitance.

In an exemplary embodiment of the AM-EWOD device, the second capacitance is ten percent of the first capacitance or less.

In an exemplary embodiment of the AM-EWOD device, the active element is a transistor. In the first mode of sensitivity the transistor has a first capacitance between gate and at least one of source and drain terminals, and in the second mode of sensitivity the transistor has a second capacitance between the gate and at least one of source and drain terminals, and the first capacitance is greater than the second capacitance.

In an exemplary embodiment of the AM-EWOD device, the first mode of sensitivity corresponds to a low range of sensitivity, and the second mode of sensitivity corresponds to a high range of sensitivity relative to the first mode of sensitivity.

In an exemplary embodiment of the AM-EWOD device, the at least first mode and second mode further comprises a third mode, wherein the third mode corresponds to a mode of sensitivity intermediate between the first and second modes of sensitivity.

In an exemplary embodiment of the AM-EWOD device, the device further includes a hydrophobic surface.

In an exemplary embodiment of the AM-EWOD device, in the first mode of sensitivity, the sensor circuitry is configured to sense a liquid droplet on the hydrophobic surface.

In an exemplary embodiment of the AM-EWOD device, in the second mode of sensitivity, the sensor circuitry is configured to detect a change in an electrical property of the hydrophobic surface.

In an exemplary embodiment of the AM-EWOD device, the device further includes a receptor for, in the second mode of sensitivity, binding molecules detected on the hydrophobic surface.

In an exemplary embodiment of the AM-EWOD device, the device further includes a first substrate containing the plurality of array elements.

In an exemplary embodiment of the AM-EWOD device, the plurality of array elements are arranged in an array of a plurality of rows and columns.

Another aspect of the invention is a method of operating an active matrix electrowetting on dielectric (AM-EWOD) device, wherein the AM-EWOD device includes a plurality of array elements configured to manipulate one or more droplets of fluid on an array. The method includes the steps of applying a first voltage to a row select line of an array element, setting sensor circuitry of the array element to operate in a first mode of sensitivity based on the first voltage, applying a second voltage to the row select line, and setting the sensor circuitry of the array element to operate in a second mode of sensitivity based on the second voltage, wherein the first and second modes of sensitivity have differing sensitivity ranges.

In an exemplary embodiment of the method, the first mode of sensitivity has a low sensitivity range and the second mode of sensitivity has a high sensitivity range relative to the first mode of sensitivity.

In an exemplary embodiment of the method, the method further includes, in the first mode of sensitivity, detecting with the sensor circuitry a liquid droplet on a hydrophobic surface of an array element from among the plurality of array elements, and in the second mode of sensitivity, detecting with the sensor circuitry a change in an electrical property of the hydrophobic surface of the array element.

In an exemplary embodiment of the method, the method further includes performing a manipulation operation based on the detections, wherein the manipulation operation comprises at least one of moving a droplet containing a cleaning fluid over the array element, binding detected molecules to receptors on the hydrophobic surface, coalesce a plurality of droplets on the array element to initiate a reaction, and analyze biological or chemical species adsorbed on the hydrophobic surface of the array element.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The AM-EWOD device could form a part of a lab-on-a-chip system. Such devices could be used in manipulating, reacting and sensing chemical, biochemical or physiological materials. Applications include healthcare diagnostic testing, chemical or biochemical material synthesis, proteomics, tools for research in life sciences and forensic science.

The invention claimed is:

1. An active matrix electrowetting on dielectric (AM-EWOD) device, comprising:
    a plurality of array elements configured to manipulate one or more droplets of fluid on an array, each of the array elements including a corresponding array element circuit,
    wherein each array element circuit includes:
        write circuitry configured to write data to the corresponding array element for controlling the manipulation of the one or more droplets of fluid; and
        sensor circuitry configured to sense an impedance present at the corresponding array element, and the sensor circuitry is configured to operate in one of at least a first mode or a second mode of operation each sensing over different impedance ranges;
    wherein the sensor circuitry includes an active element, and a capacitance across the active element is different in the first mode of operation as compared to the second mode of operation;
    wherein an output of the write circuitry is connected to a terminal of the active element; and wherein the write circuitry is configured to receive an initialization voltage, and the capacitance of the active element is changed by modifying the initialization voltage, thereby selecting a mode of operation of the sensor circuitry as between the first mode of operation and the second mode of operation.

2. The AM-EWOD device of claim 1, wherein:
the active element is an active capacitor;
in the first mode of operation the active capacitor has a first capacitance and in the second mode of operation the active capacitor has a second capacitance; and
the first capacitance is greater than the second capacitance.

3. The AM-EWOD device of claim 2, wherein the second capacitance is ten percent of the first capacitance or less.

4. The AM-EWOD device of claim 1, wherein:
the active element is a transistor connected between an array element electrode and a row select line;
in the first mode of operation the transistor has a first capacitance between gate and at least one of source and drain terminals, and in the second mode of operation the transistor has a second capacitance between the gate and at least one of source and drain terminals; and
the first capacitance is greater than the second capacitance.

5. The AM-EWOD device of claim 1, wherein the first mode of operation corresponds to a low range of sensitivity to impedance variation, and the second mode of operation corresponds to a high range of sensitivity to impedance variation relative to the first mode of operation.

6. The AM-EWOD device of claim 5, wherein the at least first mode and second mode further comprises a third mode, wherein the third mode corresponds to a mode of operation intermediate between the first and second modes of operation with respect to variation in impedance.

7. The AM-EWOD device of claim 1, further comprising a hydrophobic surface.

8. The AM-EWOD device of claim 7, wherein in the first mode of operation, the sensor circuitry is configured to sense a liquid droplet on the hydrophobic surface.

9. The AM-EWOD device of claim 7, wherein in the second mode of operation, the sensor circuitry is configured to detect a change in an electrical property of the hydrophobic surface.

10. The AM-EWOD device of claim 8, further comprising a receptor for, in the second mode of operation, binding molecules detected on the hydrophobic surface.

11. The AM-EWOD device of claim 1, further comprising a first substrate containing the plurality of array elements.

12. The AM-EWOD device of claim 1, wherein the plurality of array elements are arranged in an array of a plurality of rows and columns.

13. A method of operating an active matrix electrowetting on dielectric (AM-EWOD) device, wherein the AM-EWOD device includes a plurality of array elements configured to manipulate one or more droplets of fluid on an array, each array element including write circuitry configured to receive an initialization voltage and an active element whose capacitance varies based on the initialization voltage applied to the write circuitry, the method comprising the steps of:
applying a first initialization voltage to the write circuitry of an array element;
setting sensor circuitry of the array element to operate in a first mode of operation based on the first initialization voltage;
applying a second initialization voltage to the write circuitry to set the sensor circuitry of the array element to operate in a second mode of operation based on the second initialization voltage;
wherein the capacitance of the active element changes based on the second initialization voltage relative to said capacitance when the first initialization voltage is applied to switch between the first mode of operation and the second mode of operation.

14. The method of operating an AM-EWOD device of claim 13, wherein the first mode of operation has a low sensitivity range of capacitance across the array element and the second mode of sensitivity has a high sensitivity range of capacitance across the array element relative to the first mode of operation.

15. The method of operating an AM-EWOD device of claim 13, further comprising:
in the first mode of operation, detecting with the sensor circuitry a liquid droplet on a hydrophobic surface of an array element from among the plurality of array elements; and
in the second mode of operation, detecting with the sensor circuitry a change in an electrical property of the hydrophobic surface of the array element.

16. The method of operating an AM-EWOD device of claim 15, further comprising performing a manipulation operation based on the detections, wherein the manipulation operation comprises at least one of moving a droplet containing a cleaning fluid over the array element, binding detected molecules to receptors on the hydrophobic surface, coalesce a plurality of droplets on the array element to initiate a reaction, and analyze biological or chemical species adsorbed on the hydrophobic surface of the array element.

17. The method of operating an AM-EWOD device of claim 13, wherein initialization voltages $V_{INI}$ respectively for the first and second modes of operation are based on a threshold voltage of accumulation of the active element Vth.

18. The method of operating an AM-EWOD device of claim 17, wherein:
the AM-EWOD device further comprises a row select line that inputs a row select line voltage signal to the active element;
a range of the row select line voltage signal is between a high level maximum VRWSH and a low level minimum VRWSL;
in the first mode of operation the initialization voltage $V_{INI}$ is relatively high as compared to the second mode of operation, and is greater than the threshold voltage plus the maximum of the row select line voltage signal, $V_{INIH} > Vth + VRWSH$; and
in the second mode of operation the initialization voltage $V_{INI}$ is relatively low as compared to the first mode of operation, and is less than the threshold voltage plus the minimum of the row select line voltage signal, $V_{ININL} < Vth + VRWSL$.

* * * * *